March 16, 1937.   G. McD. JOHNS   2,073,870
COIN CONTROLLED VENDING APPARATUS
Filed Dec. 27, 1932   15 Sheets-Sheet 1

INVENTOR
George McD. Johns
By Ralph [Roebuck?]
ATTORNEY

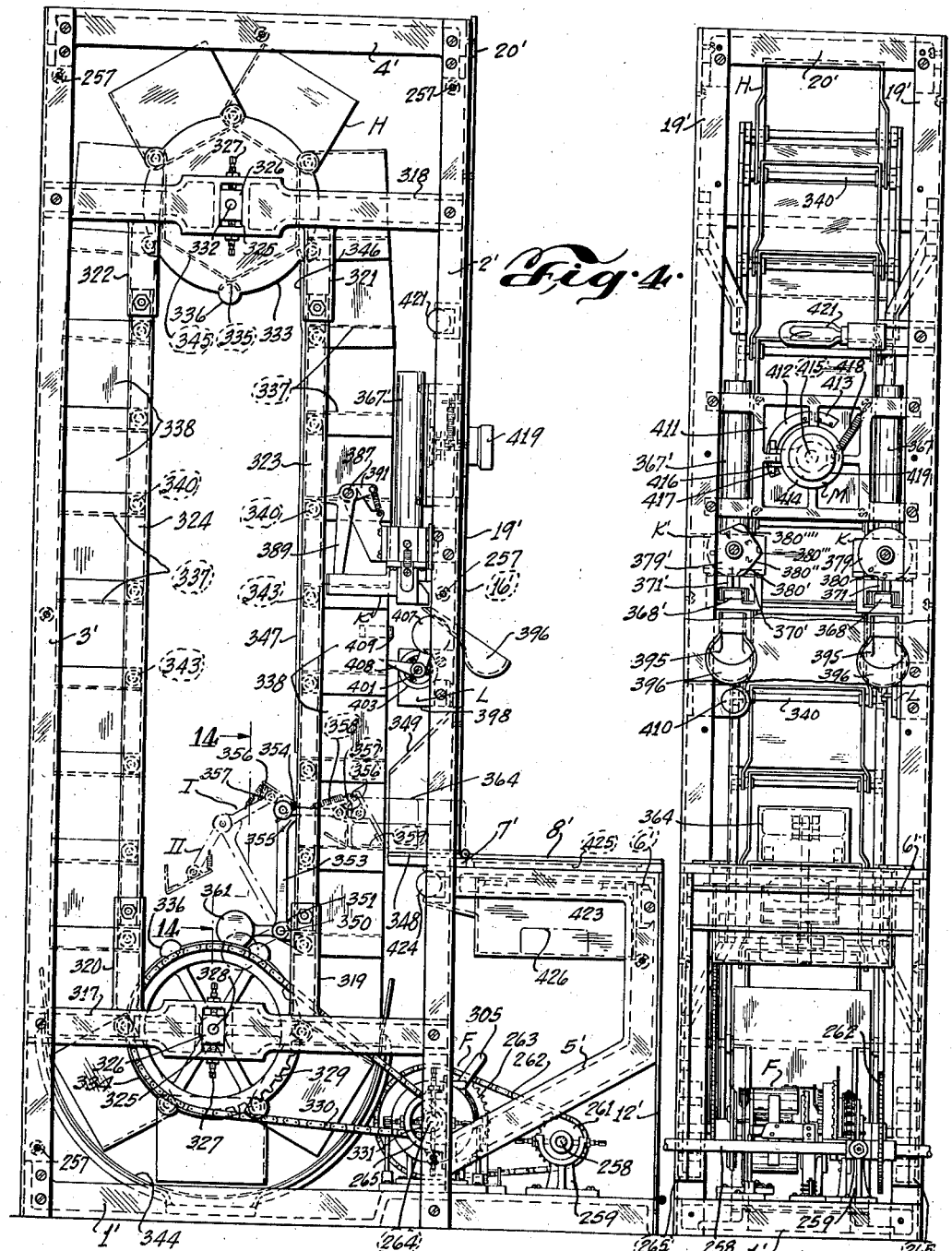

March 16, 1937.  G. McD. JOHNS  2,073,870
COIN CONTROLLED VENDING APPARATUS
Filed Dec. 27, 1932  15 Sheets-Sheet 3
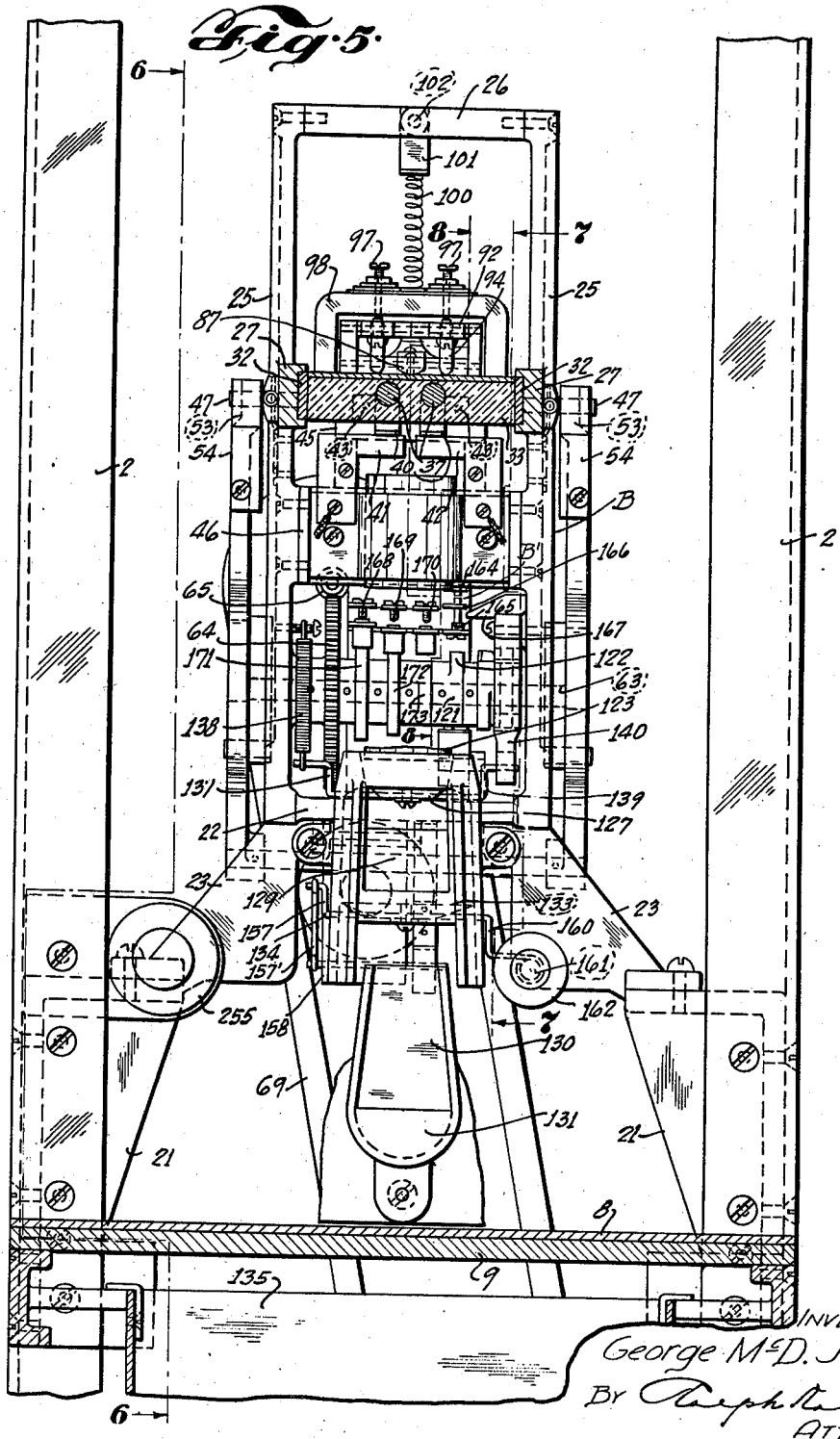
INVENTOR
George McD. Johns
By [signature]
ATTORNEY

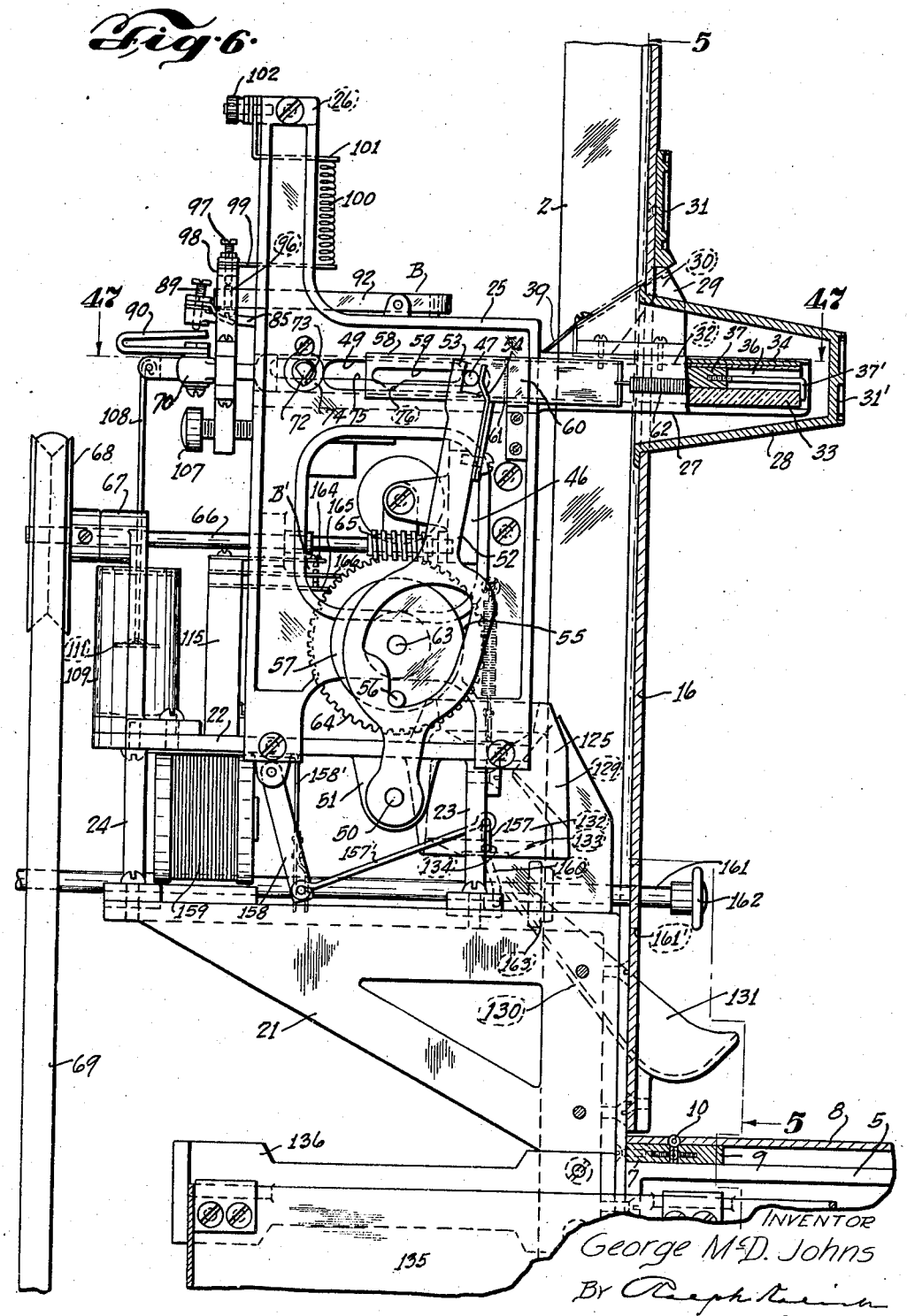

March 16, 1937. G. McD. JOHNS 2,073,870
COIN CONTROLLED VENDING APPARATUS
Filed Dec. 27, 1932 15 Sheets-Sheet 5
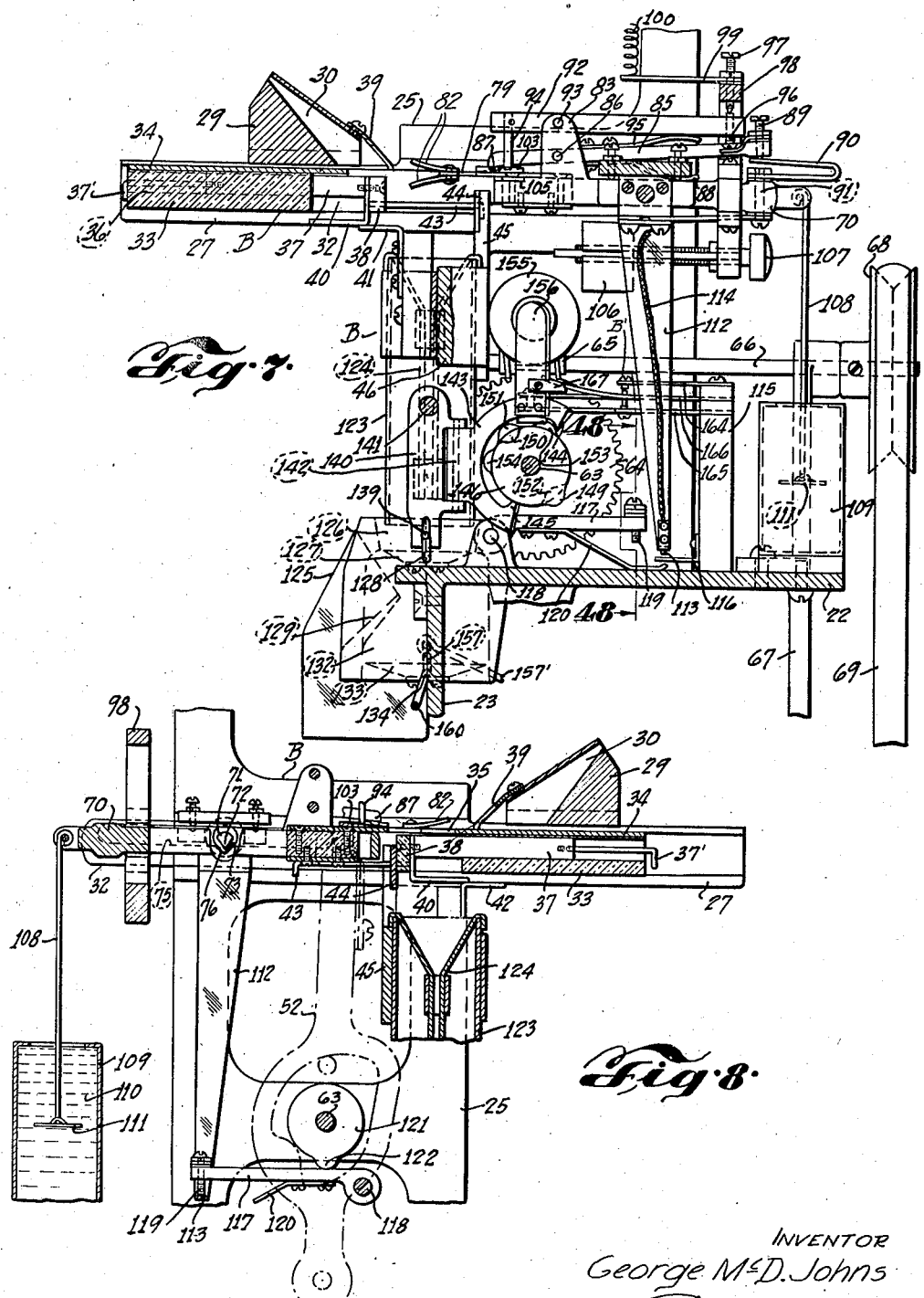
INVENTOR
George McD. Johns
By
ATTORNEY INVENTOR
George McD. Johns
By Ralph Neesh
ATTORNEY INVENTOR
George McD. Johns
By Ralph Keech
ATTORNEY

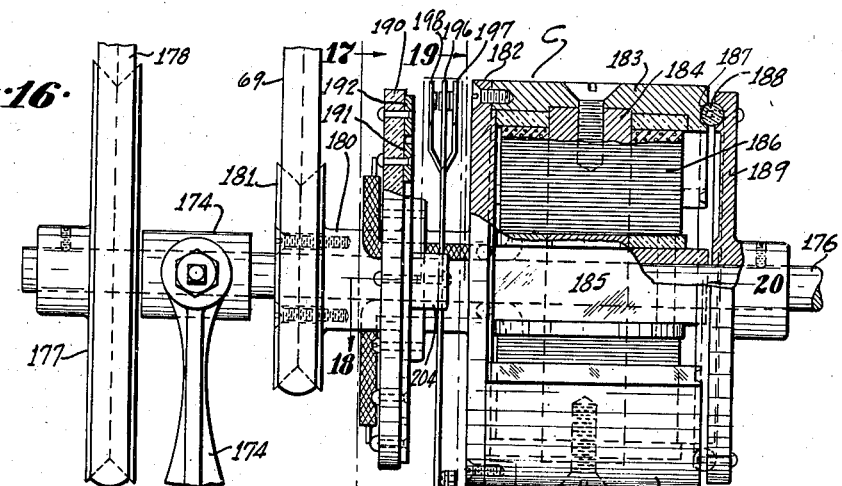
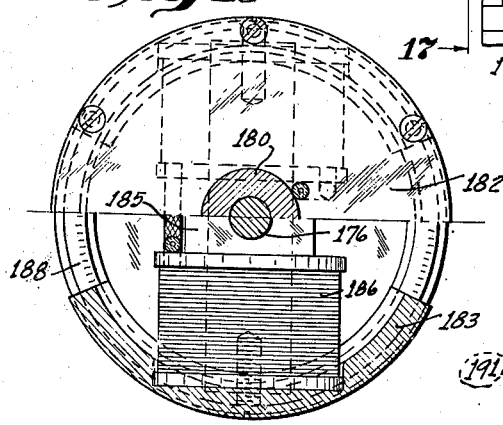
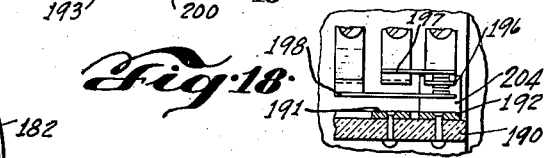
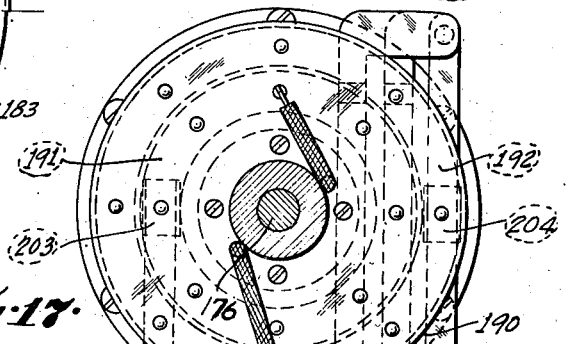
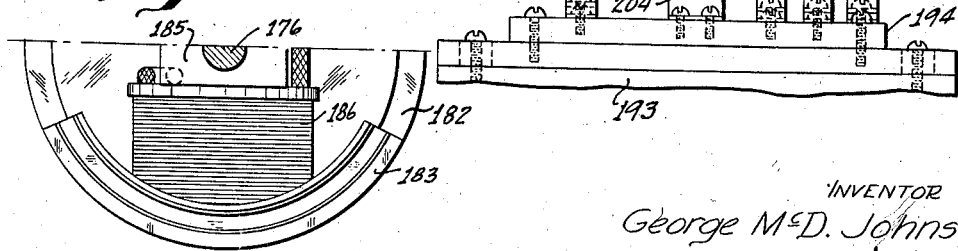

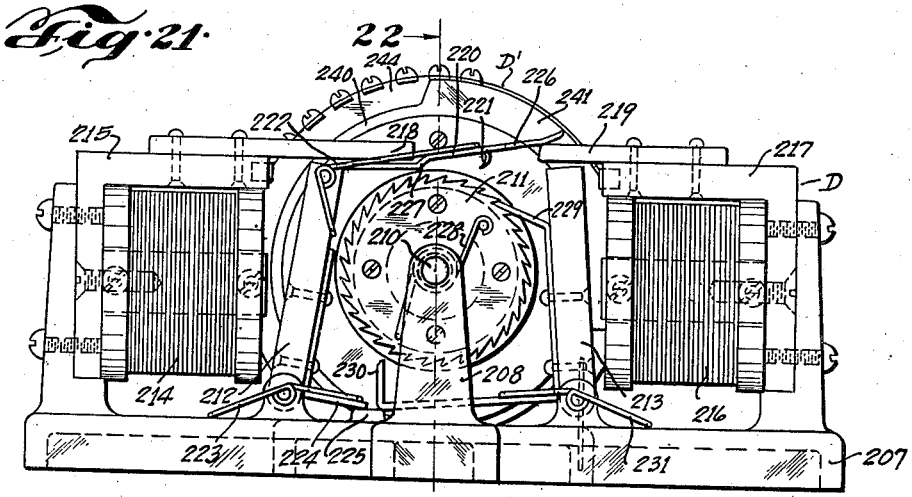
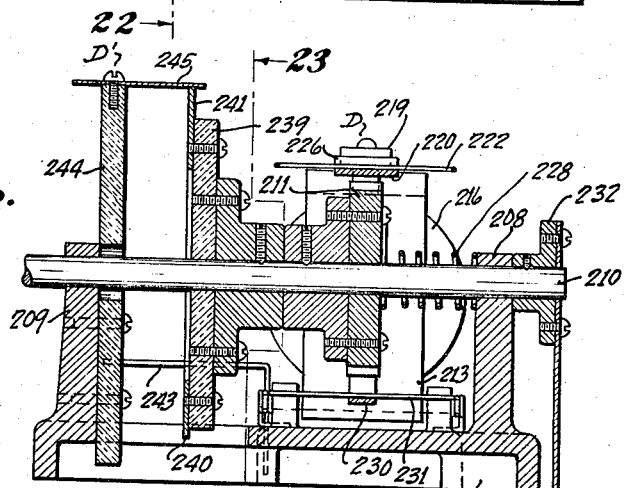
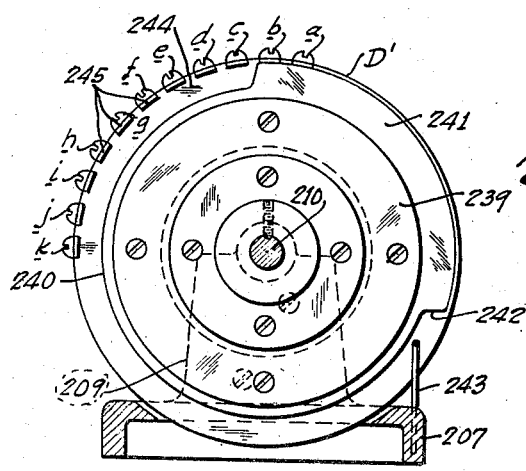

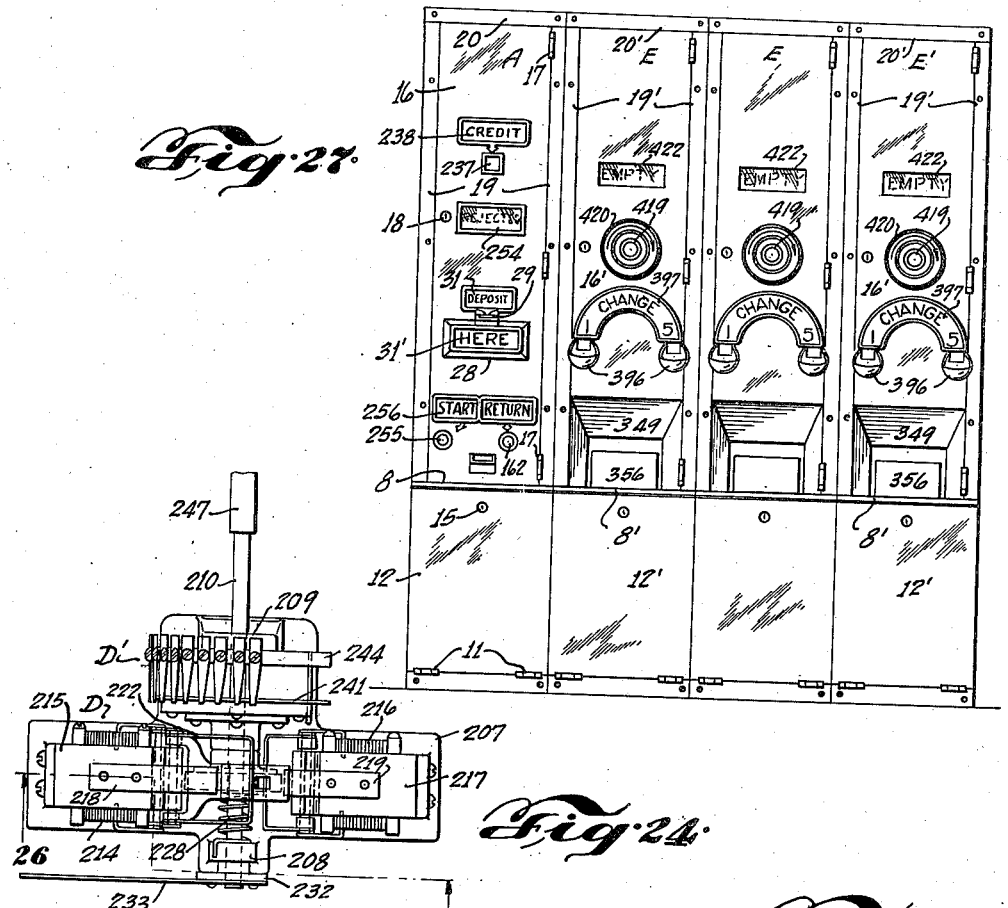

March 16, 1937. G. McD. JOHNS 2,073,870
COIN CONTROLLED VENDING APPARATUS
Filed Dec. 27, 1932 15 Sheets-Sheet 11
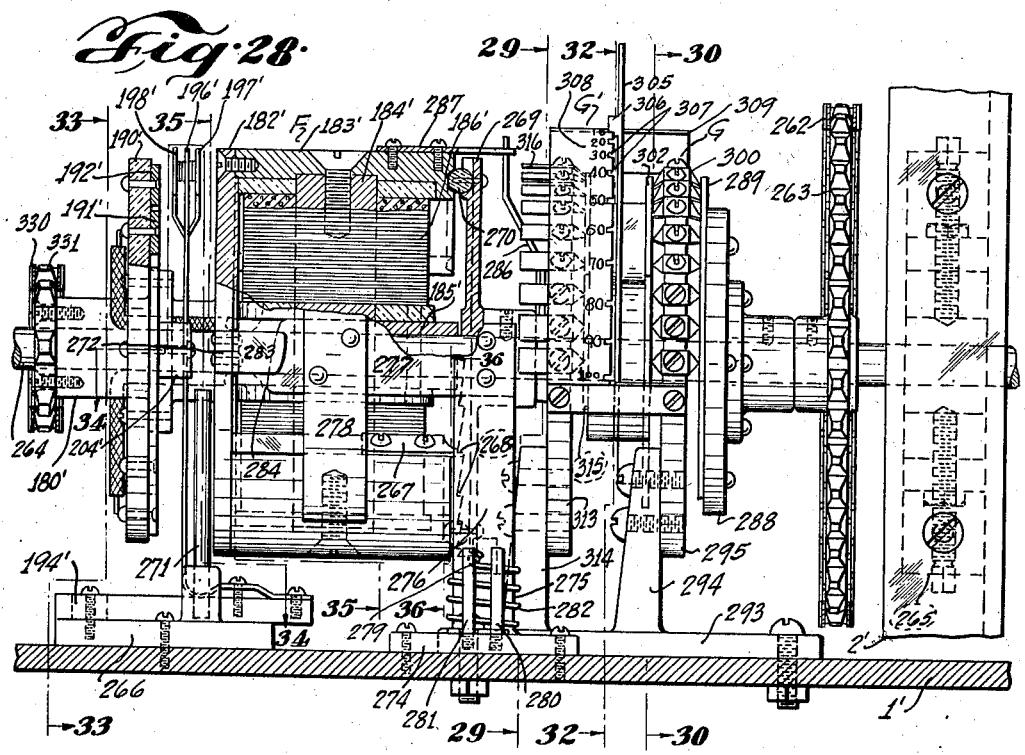
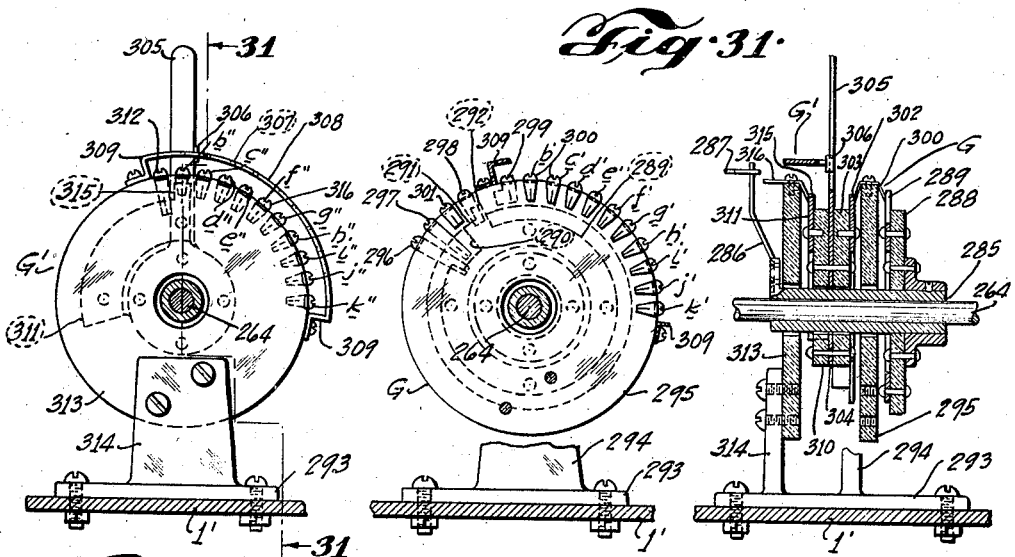
INVENTOR
George McD. Johns
By Joseph Kresin
ATTORNEY March 16, 1937.　　　G. McD. JOHNS　　　2,073,870
COIN CONTROLLED VENDING APPARATUS
Filed Dec. 27, 1932　　　15 Sheets-Sheet 12
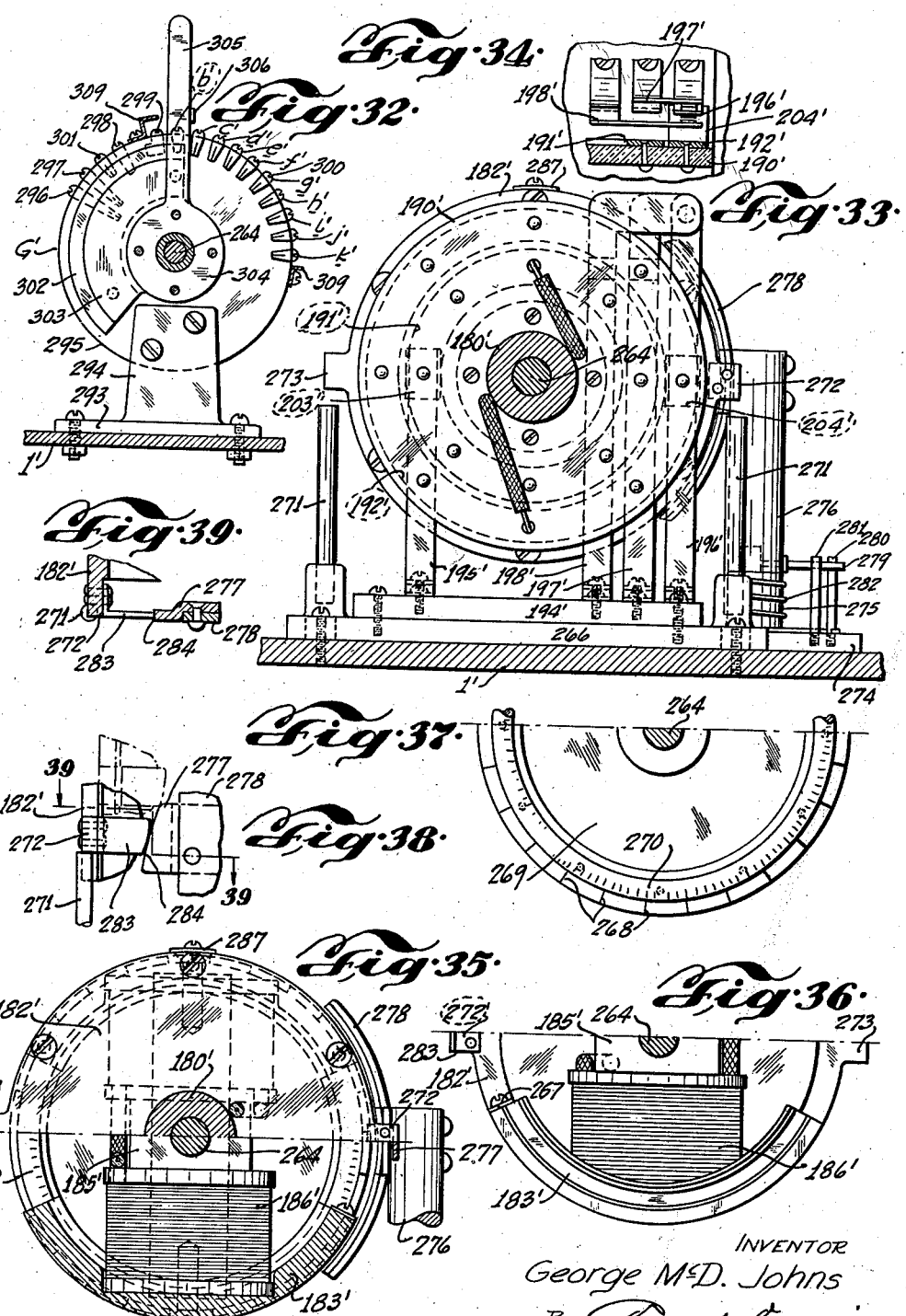
INVENTOR
George McD. Johns
By Raeph Newen
ATTORNEY

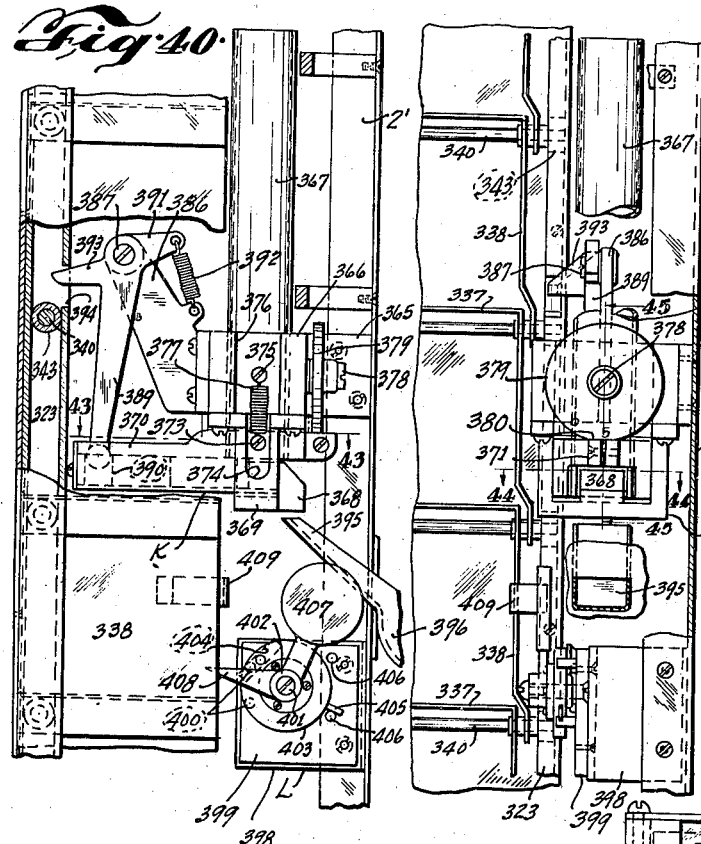

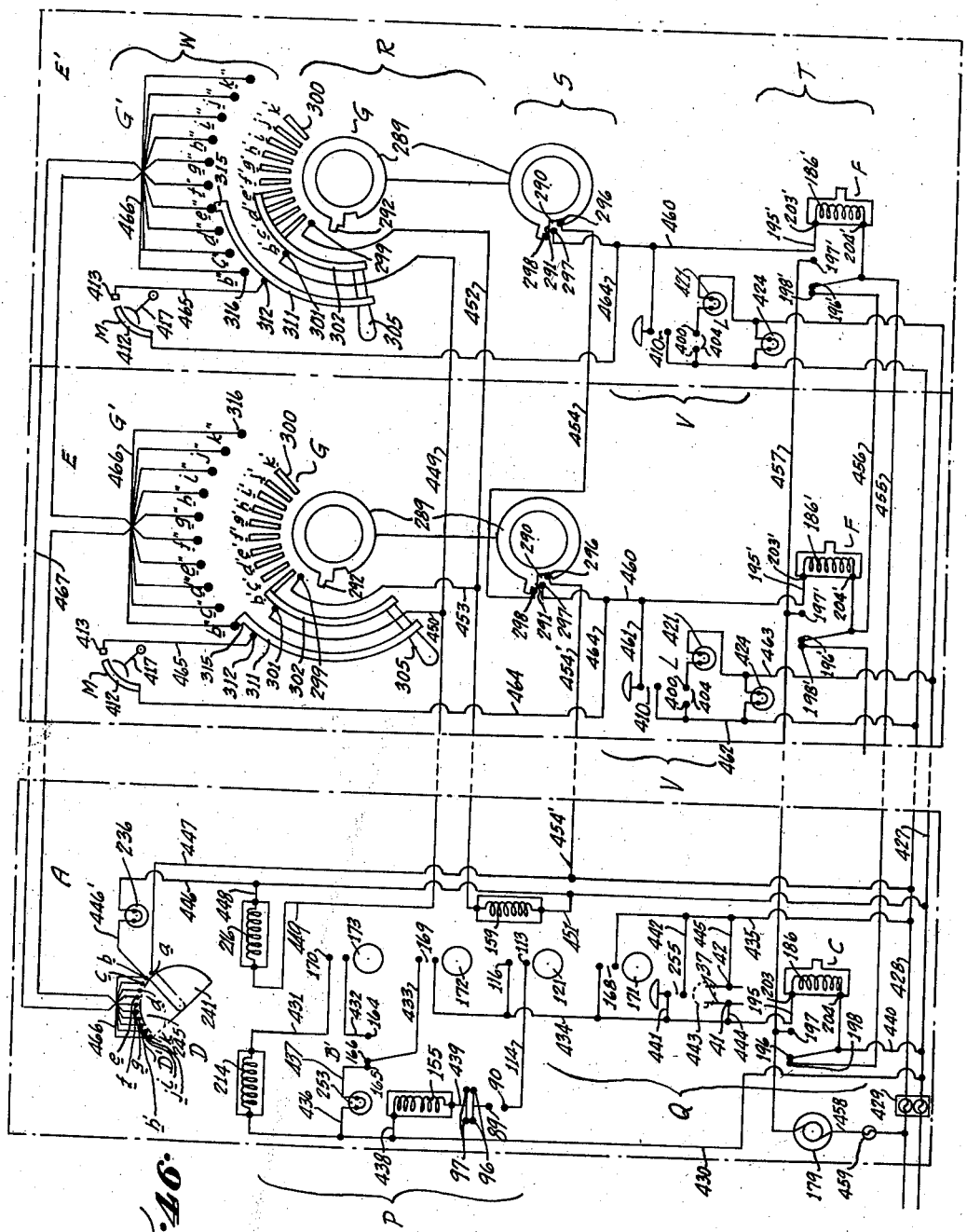

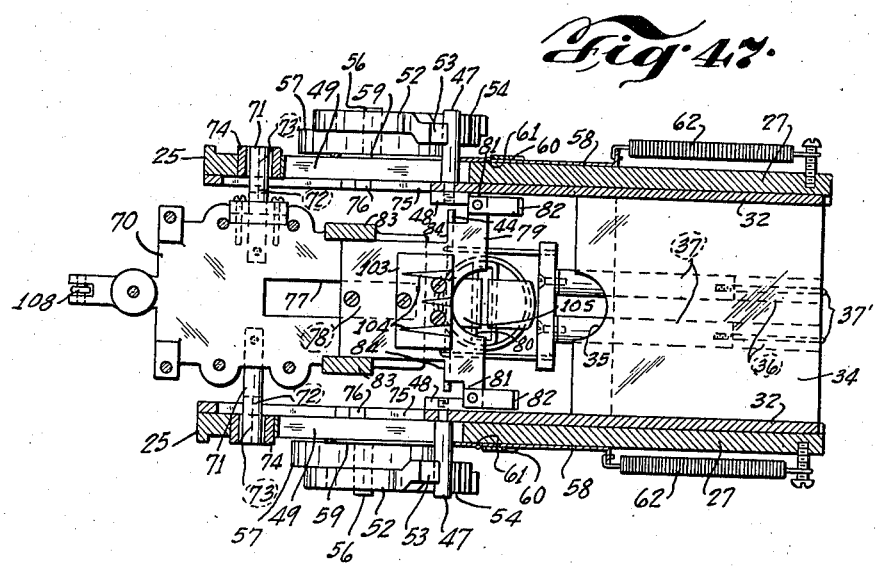
Fig. 47.
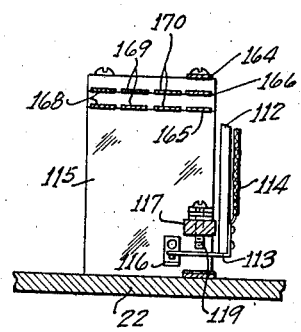
Fig. 48.
Fig. 49.
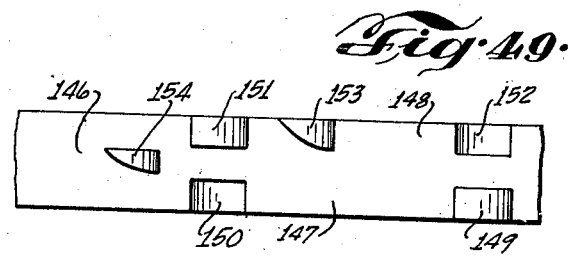
INVENTOR
George McD. Johns
By Joseph [illegible]
ATTORNEY Patented Mar. 16, 1937

2,073,870

UNITED STATES PATENT OFFICE 2,073,870

COIN CONTROLLED VENDING APPARATUS

George McD. Johns, Robyn and Denny Roads, near Sappington, Mo.

Application December 27, 1932, Serial No. 648,927

56 Claims. (Cl. 194—10)

This invention relates generally to automatic vending machines and has more particular reference to certain new and useful improvements in vending apparatus of coin-controlled type.

My invention has for an object the provision of an automatic vending apparatus or machine comprising a plurality of dispensing sections for vending an assortment of severally priced articles under control of a coin-selecting mechanism common to all of the dispensing sections.

My invention has for another object the provision of an automatic vending apparatus comprising a coin selecting mechanism, a dispensing mechanism, and an accounting mechanism additively operable for accumulating items responsively to acceptance of coins by the selecting-mechanism and subtractively operable for deducting items responsively to actuation of the dispensing mechanism.

My invention has for another object the provision of a coin-controlled vending apparatus in which a coin-selecting mechanism actuates an accounting mechanism for controlling a dispensing mechanism in such manner that a predetermined quantity of items must be accumulated by the accounting mechanism before the dispensing mechanism may be actuated for vending purposes.

And with the above and other objects in view, my invention resides in the novel features of form, construction, arrangement, and combination of parts hereinafter described and pointed out in the claims.

In the accompanying drawings (15 sheets),—

Figure 3 is a side elevational view, partly in section, of one of the merchandise-vending sections of the machine, the front closures being shown and the housing-walls removed;

Figure 4 is a front elevational view of the machine parts illustrated in Figure 3, the vending-drive shaft being fragmentally shown and the front-closures removed;

Figure 5 is an enlarged front view, partly broken away and in section, of the coin-selecting mechanism, together with fragmentary portions of the control-section frame, the view being taken approximately along the line 5—5, Figure 6, Figure 6 is a side view, partly broken away and in section, of the coin-selecting mechanism, together with a fragmentary portion of the front closure of the control-section, the view being taken approximately along the line 6—6, Figure 5;

Figure 7 is a fragmentary vertical sectional view taken approximately along the line 7—7, Figure 5, showing the coin-selecting mechanism in normal or coin-rejecting position.

Figures 1, 2:
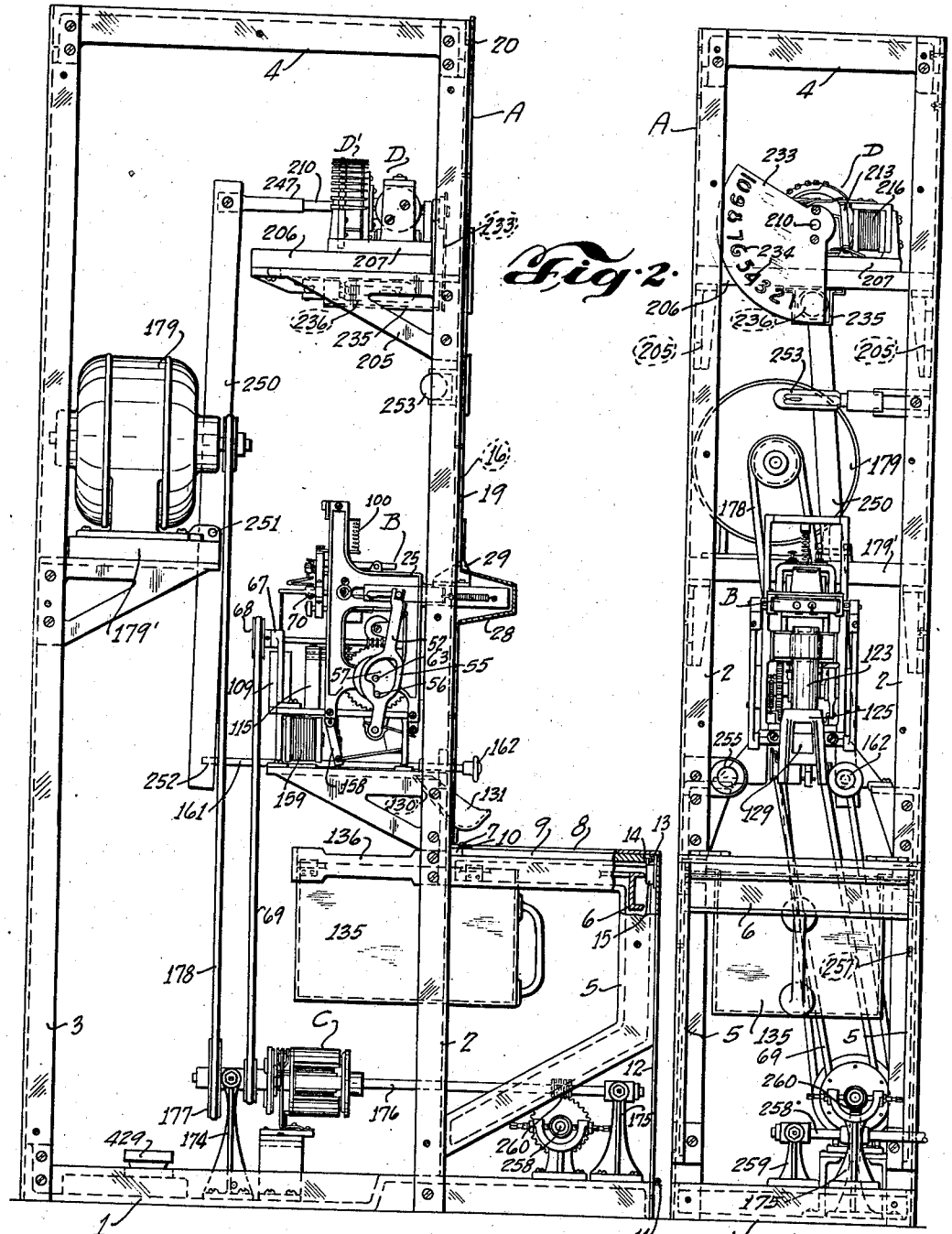
Figure 1 is a side elevational view, partly in section, of the coin responsive-control section of the machine of my invention, the front closures being shown and the housing walls removed.
Figure 2 is a front elevational view of the machine parts illustrated in Figure 1, the vending-drive shaft being fragmentally shown and the front-closures removed.
Figure 9:
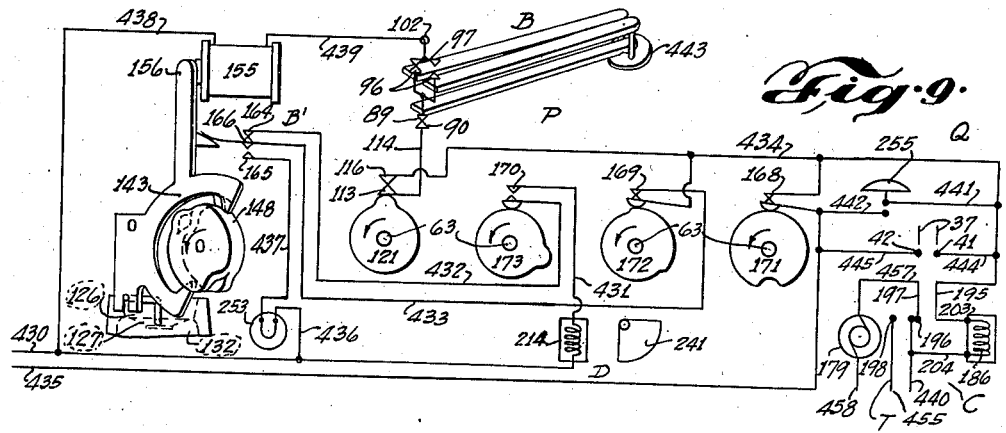
Figure 10:
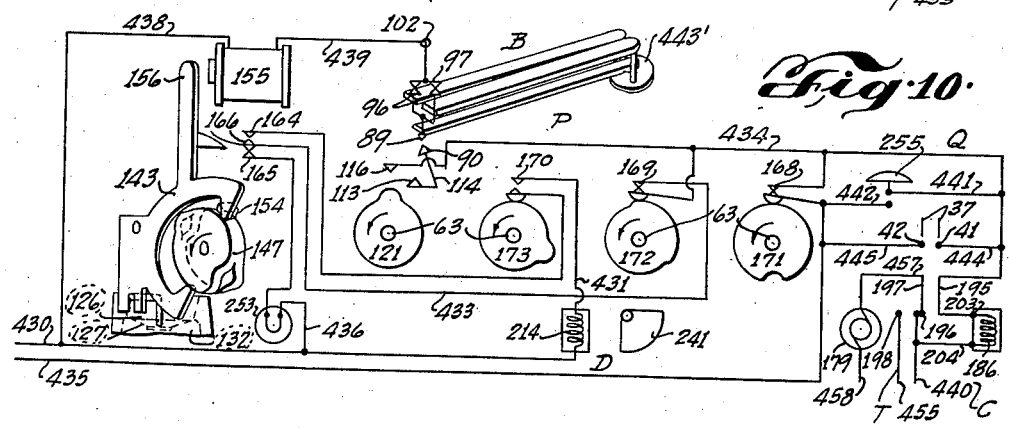
Figure 11:
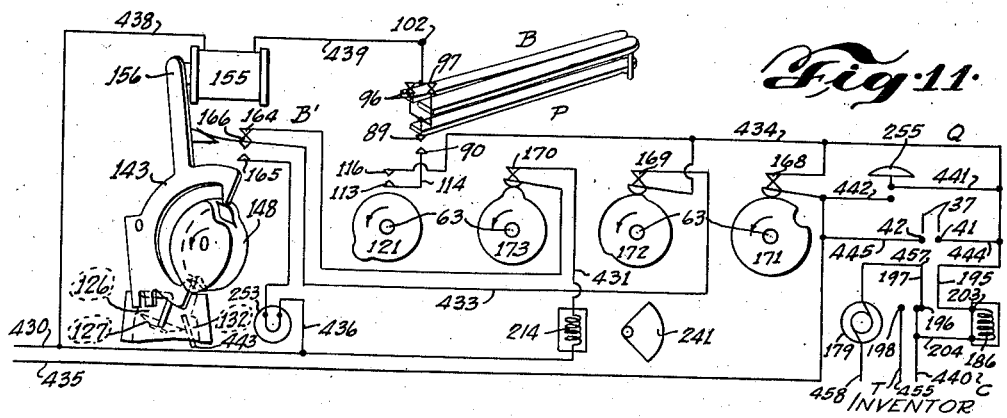
Figure 12:
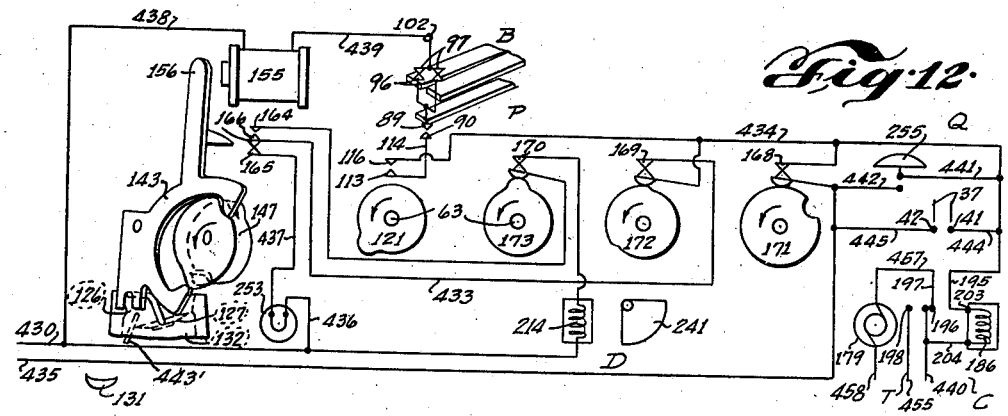
Figure 13:
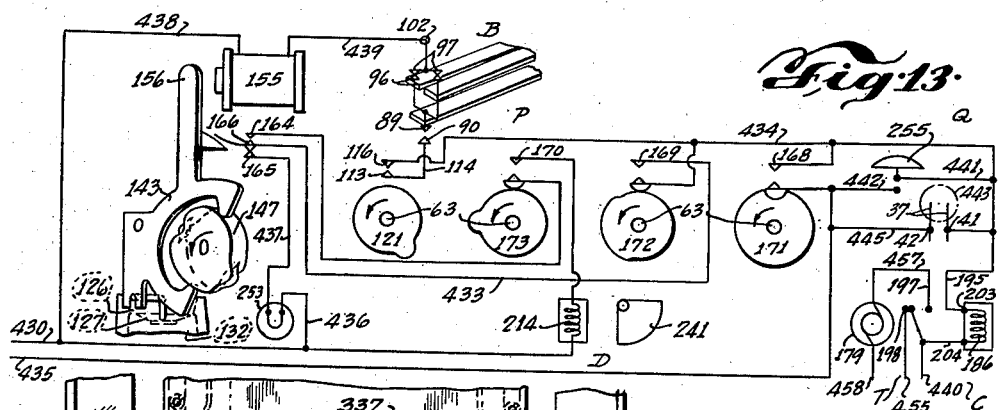
Figure 14:
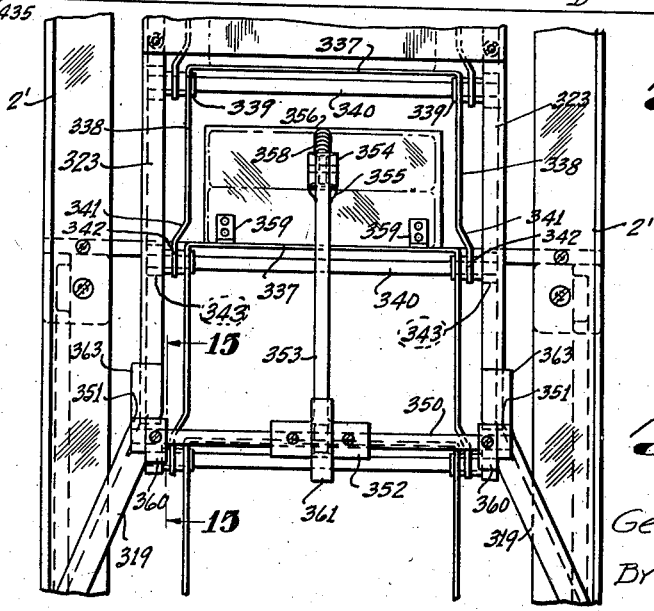
Figure 15:
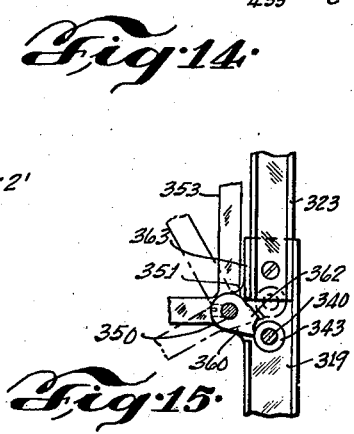

Figure 8 is a fragmentary sectional view taken approximately along the line 8—8, Figure 5, showing the mechanism in the operation of weighing a coin, the parts co-operating for such purpose being shown and other parts removed, one of the slide-operating vibratory levers, however, being shown by dot-dash lines;

Figure 9 is a diagram of the electrical circuit of the coin-selecting mechanism during the coin-selecting operation thereof, as existing on acceptance of a coin;

Figure 10 is a view similar to Figure 9, as existing on rejection of a coin;

Figure 11 is a view of the electrical circuit of the coin-selecting mechanism during the coin-distributing operation as existing on acceptance of a coin;

Figure 12 is a view similar to Figure 11, as existing on rejection of a coin;

Figure 13 is a view of the electrical circuit of the coin-selecting mechanism as existing in normal or coin-depositing condition thereof, a deposited coin being shown in dot-dash lines for illustrating the manner in which a deposited coin effects closure of a circuit resulting in initiation of motor actuation of the mechanism;

Figure 14 is a fragmentary rear view of the merchandising discharging mechanism for vending section, together with portions of the conveyer apparatus, the view being taken approximately along the line 14—14, Figure 3;

Figure 15 is a fragmentary detail sectional view taken approximately along the line 15—15, Figure 14 showing the discharging-actuating mechanism in feeding position, successive positions of the feeder and cam being indicated by dot-dash lines;

Figure 16 is an enlarged detail view, partly broken away and in section, of the clutch for the coin-selecting-mechanism, parts co-operating therewith being fragmentally shown and other parts removed;

Figure 17 is a rear detail view, partly broken away and in section, of the clutch switch plate, the view being taken approximately along the line 17—17, Figure 16;

Figure 18 is a top plan view of the motor-control switch, merely a fragmentary portion of the clutch-switch plate being sectionally shown, the view being taken approximately along the line 18—18, Figure 16;

Figure 19 is a rear view, partly in section, of the clutch-mechanism, taken approximately along the line 19—19, Figure 16;

Figure 20 is a half-front sectional view of the clutch-barrel, taken approximately along the line 20—20, Figure 16;

Figure 21 is an enlarged front elevational view of the accounting mechanism of the control section, the indicator-dial being removed, and the parts shown as at the completion of one or the initial accumulative actuation thereof;

Figure 22 is a transverse sectional view taken approximately along the line 22—22, Figure 21, the indicator-dial being shown in section;

Figure 23 is a sectional view taken approximately along the line 23—23, Figure 22, illustrating the vending control-switch of the accounting mechanism;

Figure 24 is a reduced top-plan view of the accounting mechanism, the accumulator-shaft being fragmentarily shown;

Figure 25 is a side view, partly broken away and in section, of the accounting mechanism illustrating also the dial-illuminating lamp, the accumulator-shaft resetting plunger, and a fragmentary portion of its resetting lever;

Figure 26 is a front partly sectional view of the machine parts shown in Figure 24, taken approximately along the line 26—26, thereof, illustrating also the dial-illuminating lamp;

Figure 27 is a reduced front elevational view of an automatic vending apparatus of my invention, embodying the coin-selecting and accounting section of Figure 1 and a plurality of merchandise-vending sections, similar to that of Figure 3, assembled in unitary row relation;

Figure 28 is an enlarged front view, partly broken away and in section, of the clutch for the vending section, parts co-operating therewith being fragmentally shown and other parts removed;

Figure 29 is an elevational view of the price-selector switch of the vending section, taken approximately along the line 29—29, Figure 28;

Figure 30 is an elevational view of the subtractor-switch of the vending-section, taken approximately along the line 30—30, Figure 28;

Figure 31 is a transverse sectional view of the price-selector and subtractor switches, taken approximately along the line 31—31, Figure 29;

Figure 32 is a view of the subtractor-switch rotor and its switch-plate, taken approximately along the line 32—32, Figure 28;

Figure 33 is an end sectional view of the vending-section clutch, taken approximately along the line 33—33, Figure 28;

Figure 34 is a sectional view of the vending section motor-control switches, taken approximately along the line 34—34, Figure 28, merely a fragmentary portion of the clutch switch-plate being shown;

Figure 35 is a sectional view of the vending section clutch, taken approximately along the line 35—35, Figure 28;

Figure 36 is a half sectional view of the vending section clutch, taken approximately along the line 36—36, Figure 28;

Figure 37 is a half sectional view of the vending section clutch, also taken approximately along the line 36—36, Figure 28, but looking in the opposite direction from Figure 36;

Figure 38 is a fragmentary detail view of a portion of the clutch throw-out apparatus, showing the throw-out armature cam and the clutch-barrel lug co-operating therewith, the position of the clutch-barrel prior to engagement of the lug with the cam being shown by dot-dash lines;

Figure 39 is a fragmentary sectional view taken approximately along the line 39—39, Figure 38;

Figure 40 is a fragmentary sectional view, partly broken away and in section, of one of the change-making mechanisms and the conveyer-empty switch, fragmentary portions of the conveyer mechanism co-operating therewith being shown and other parts of the machine removed;

Figure 41 is a front view, partly broken away and in section, of the change making mechanisms of Figure 40, a fragmentary portion of the conveyer being shown and other parts of the mechanism removed;

Figure 42 is a top plan view of the machine parts shown in Figure 41;

Figure 43 is an elongated sectional plan view taken approximately along the line 43—43, Figure 40;

Figure 44 is a fragmentary plan sectional view of the coin-pusher slide, taken approximately along the line 44—44, Figure 41;

Figure 45 is a fragmentary vertical sectional view through the coin-discharge end of a change-making chute as appearing during discharge of a coin, taken approximately along the line 45—45, Figure 41;

Figure 46 is a diagram of the electrical circuit of the automatic vending apparatus of Figure 27, an intermediate vending section being removed;

Figure 47 is a sectional view of the coin-feeding slide and weighing frame taken approximately along the line 47—47, Figure 6;

Figure 48 is a fragmentary view taken approximately along the line 48—48, Figure 7; and Figure 49 is a developed plan view of the surface of the coin-distributor-cam drum.

Referring now more in detail and by reference characters to the drawings, which illustrate a preferred embodiment of my invention, A designates the control-section or coin-selecting and accounting unit of the apparatus, the main frame of which includes an approximately rectangular base 1 supporting upstanding pairs of transversely spaced front and rear corner posts 2, 3, respectively, united at their upper end by a top-frame 4. The posts 2 are set back from the front margin of the base 1 and at a suitable elevation thereabove carry a pair of forwardly projecting brackets 5 suitably connected by front and rear transverse or cross-bars 6, 7, respectively.

8 designates an upwardly swingable door or lid including a frame 9 hinged, as at 10, to the rear cross-bar 7. Also hinged, as at 11, to the front margin of the base 1, is a downwardly swingable closure-panel or door 12. At its free margin, the door 12 carries a lip 13 for fitting between the free margin of the door 8 and a ledge 14 projecting from the door frame 9, and the door 12 further carries a lock 15 having an extension bolt engageable with a suitable aperture provided in the ledge 14 for locking the doors 8, 12, mutually, as may be said, together when in their respective closed positions, as best seen in Figure 1.

The space between the posts 2 above the lid 8 is closable by a door 16 hinged, as at 17, to one of the posts 2 and having a lock 18 for co-operation with the other post 2, suitable side and head casing-strips 19, 20, respectively, surrounding the door 16, as best seen in Figure 27.

The coin-selecting apparatus B includes a frame supported on brackets 21 rearwardly projecting from the front posts 2 and comprising a horizontal platform or shelf 22 having front and rear pairs of depending legs 23, 24, respectively, supported on the brackets 21, and, upstanding from the shelf 22, is a pair of spaced side frames 25 connected at their upper rear corners by a suitable cross-bar 26, as best seen in Figures 5 and 6.

Each frame 25 includes a preferably integrally formed horizontal channel-shaped slide-rail 27, the pair of slide rails 27 projecting forwardly through the door 16 into a pocket or casing 28 mounted on the door 16. The casing 28 suitably encloses a coin-depository 29 of a generally pyramidal shape, the base of the depository 29 being mounted on and between the slide-rails 27 for projecting its apex suitably through the upper wall of the casing 28.

The depository 29 is provided with a downwardly and inwardly sloping coin-chute 30 opening through the apex of the depository, most accessibly for customers' convenience. Suitable legends are provided, as at 31, on the door 16 and, as at 31', on the front wall of the casing 28, for directing the customer's attention to the mouth of the chute 30 for coin depositing.

The coin selecting apparatus B is generally similar to that described in my co-pending application for Letters Patent for coin-selectors, filed January 19, 1931, Serial No. 509,581, to which reference is made.

Briefly, the coin-selecting apparatus B includes a coin-feeding mechanism comprising a pair of spaced slide-bars 32 reciprocable in suitably complementary ways provided in the respective slide-rails 27. Supported by and between the bars 32, is a feeder-body 33 of insulation material, supporting a coin-feeder plate 34 provided with a semi-circular notch 35 disposed for registration, when the feeder-body 33 is in forward or retracted position under the depository 29, with the lower or discharge end of the chute 30, as best seen in Figures 7 and 47.

The body 33 is provided with a transversely spaced pair of longitudinal bores 36, in which are slidably mounted respective plungers 37 of electrically conducting material, which project rearwardly from the respective bores 36 and at their rearward end are connected by a transverse bar 38 also of insulation material and having its top-face flush with the top of the plungers 37.

The plungers 37 are each equipped with a hooked-rod 37' forwardly extending in the bore 36 for engaging the front face of the block 33 for retaining the plungers therein. Normally the plungers 37 are substantially extended from the feeder body 33 in registration also with the discharge end of the chute 30, the depository 29 carrying a pair of spring fingers 39 projecting over the plungers 37 for releasably retaining a chute-discharged coin thereupon, as will be understood from Figure 7.

The plungers 37 comprise a part of a normally open electrical circuit adapted for closure by a coin spanning said plungers, which latter are normally included in such circuit by a pair of resilient contact-fingers 40 depending from the plungers 37 for co-operative engagement with respective frame-supported circuit-contacts 41, 42. The fingers 40 are disengaged from the contacts 41, 42, however, on rearward movement of the plungers 37, as presently appearing.

The bar 38 carries a pair of rearwardly projecting hooked stop-rods 43 working in and through a stop-bar 44 mounted on posts 45 upstanding from a cross-member 46, in turn, mounted on and between the side frames 25. At their hooked ends, the rods 43 are adapted for impinging the bar 44 for withdrawing the plungers 37 from the body 33 when the mechanism B is in its normal or coin-depositing position, as best seen in Figure 7.

Each of the slide-bars 32 carries a laterally projecting stub-shaft 47 having a reduced end extending through the side-bar 32 for threaded engagement with a combined nut and stop-block 48 mounted on the inside face of the bar 32, the shafts 47 being reciprocable in longitudinal slots 49 provided through the respective rails 27, as best seen in Figure 47.

A shaft 50, rockably supported in bearings 51 depending from the shelf 22, suitably supports for unison actuation a pair of vibratory levers 52 disposed in transverse registration for respective swingable actuation adjacent the outer face of a particular frame 25, each lever 52 at its free end being provided with a lug 53 and an opposing spring-clip 54 spaced from the lug 53 for receiving a stub-shaft 47 therebetween, as best seen in Figure 6.

Each lever 52 is provided intermediate its ends with an apertured enlargement or ring-cam 55, between the interior walls of which works a wrist-pin 56 carried by a face-plate or disc 57 mounted for rotation, as presently appearing, for effecting vibratory actuation of the lever 52 and corresponding reciprocation of the slide-bars 32.

A pair of pull-back members or slides 58, longitudinally slotted, as at 59, for receiving the respective shafts 47, are reciprocably mounted in guides 60 carried by the respective frames 25, the pull-backs 58 being provided with stops 61 for impinging the guides 60 for limiting the forward movement of the pull-backs 58. Suitable tensional members in the form preferably of springs 62 are engaged between the pull-backs 58 and the frames 25 for normally biasing the pull-backs 58 in such forwardly shifted position, as best seen in Figures 6 and 47.

The co-operation of the wrist-pins 56 with the cams 55 effects a positive actuation of the slide-bars 32 to extreme rear position, the shafts 47 meanwhile impinging the end-walls of the slots 59 for shifting the pull-backs 58 rearwardly against the tension of the springs 62. The wrist-pins 56 then release the cams 55, whereupon the tensed springs 62 draw the slide-bars 32 forwardly until the cams 55 again engage the wrist-pins 56, which then work over concentric or dwell portions of the cams 55 for holding the slide bars 32 in such spring retracted position for a particular period of the reciprocatory cycle hereinafter referred to as the coin-weighing pause of the slide-bars 32. Thereafter, the wrist-pins 56 act to return the slide-bars 32 to initial position.

The discs 57 are mounted on and rotate with a main or drive-shaft 63 suitably rotarily supported transversely in and between the side-frames 25. The shaft 63 carries a worm-gear 64 meshing with a worm 65 on a shaft 66 rotarily supported in and between the frame-cross-member 46 and a rearwardly spaced bearing-stand 67 upstanding from the shelf 22. In turn, mounted on the shaft 66 for overhanging the standard 67, is a pulley 68 engaged by a depending V-belt 69 having operative engagement with a driving mechanism presently described.

Adapted for rockable actuation between the side frames 25, is a combined coin-weighing and thickness gauge which includes an oscillatory balance-frame 70, best seen in plan in Figure 47, which, for coin-receptive or feeding purposes, is disposed normally in horizontal and longitudinal alignment with the plungers 37 between the slide-bars 32 with the front end of the frame 70 swingably disposed rearwardly adjacent the stop-plate 44.

The frame 70 is provided with a pair of transversely aligned fulcrum or stub-shafts 71 each provided at its end with fulcrum-edge 72 co-operable with a fulcrum-seat 73 provided in the lower wall of a suitably apertured or hollow bushing 74 mounted in and through the adjacent frame 25, as shown in Figures 6 and 47.

The slide bars 32 are provided with horizontally registering longitudinal slots 75 for receiving the respective fulcrums 71, the lower wall of the respective slots 75 having sliding engagement with the fulcrum 71 for normally lifting the fulcrum-edges 72 from their seats 73. At its lower wall, however, each slot 75 has suitable notches or recesses 76 for registration with the fulcrums 71 during the described coin-weighing pause of the slide-bars 32 for releasing the fulcrums 71 for dropping the fulcrum-edges 72 onto their fulcrum-seats 73, as best seen in Figure 8.

The frame 70 is provided with a longitudinal slot 77, in which works a block 78 for suitably guiding a reciprocable coin positioning member or plate 79 slidable on the upper face of the frame 70 and having in its forward margin a semi-circular notch 80 disposed opposite to, and for coin-holding co-operation with, the notch 35 in the feeding-plate 34, as best seen in Figure 47.

The plate 79 is provided with lateral ears 81 for impinging the stops 48 on the slide-bars 32 for shifting the plate 79 forwardly on the frame 70, each of said ears 81 carrying a pair of flaring upper and lower fingers 82 for receiving the advancing rear margins of the plate 34 for guiding the same into horizontal registration with the plate 79, as seen in Figure 7.

Upstanding from the frame 70, is a pair of transversely spaced standards 83, the plate 79 having a reduced portion extending between the standards 83 and providing lateral shoulders 84 engageable therewith on rearward movement of the plate 79 on the frame 70 for precisely positioning a frame-deposited coin a predetermined distance from the pivotal axis of the frame 70, suitably for weighing the coin, as will shortly appear, and best understood from Figure 47.

The balance-frame 70 also supports a so-called minimum coin-thickness gauging lever 85 mounted for oscillation on a lower transverse shaft 86 supported in and between the standards 83, the lever 85 carrying at its forward end a coin-face exploring point or shoe 87 normally biased for coin-gauging purposes by means of a spring or resilient member 88 disposed between the rear end of the lever 85 and the upper face of the frame 70.

Adjustably threaded insulatably in, and depending from, the rear end of the lever 85, is a contact-screw 89 adapted for co-operative engagement with a U-shaped resilient or spring-contact 90 supported by and on a terminal stud 91, in turn, mounted insulatably in a suitable lug projecting from the rear end of the frame 70, as best seen in Figure 7.

The balance-frame 70 further supports a pair of transversely spaced so-called maximum coin-thickness gauging levers 92 mounted for oscillation on an upper shaft 93 supported also in and between the standards 83. Each of the levers 92 carries at its forward end a coin-face exploring point or shoe 94 normally biased for coin-gauging purposes by means of a suitable resilient member or spring 95 disposed between the respective rear ends of the levers 92 and the upper face of the lever 85.

Adjustably threaded insulatably in, and upstanding from, the respective rear ends of the levers 92, is a pair of contact-screws 96 adapted for co-operative engagement with a corresponding pair of stationary contacts 97 adjustably mounted in, and depending from, an upstanding inverted U-shaped frame 98 mounted suitably for the purpose on the rear end of the frame 70.

A forwardly extending conducting tongue or arm 99 is insulatably mounted on the frame 98 for electrical connection with the contacts 97, and a flexible conductor 100 is connected between the projecting end of the arm 99 and a conducting bracket 101 supported insulatably on the frame cross-member 26 for electrical connection with a terminal 102 carried thereby, as best seen in Figure 6.

In normal or non-gauging position, the exploring points 87 and 94 yieldingly repose upon a lift-plate 103 mounted on the positioning-plate 79, the lift-plate 103 having suitable point-receptive grooves or channels 104 leading to the coin-notch 80 in the plate 79, as best seen in Figure 47.

Also mounted on the forward end of the frame 70, is a coin-seat 105 for registration with the notch 80, on retraction of the plate 79, for supporting a notch-carried coin on the frame 70, the channels 104 meanwhile guiding the points 87, 94, upon the coin in the notch 80 for firmly pressing the coin upon the seat 105.

On such engagement with a coin deposited on the coin-seat 105, the lever 85 measures with its exploring point 87 the heighth or total thickness of the approximately central or embossed portion of the coin above the seat 105 as a datum. If the coin is of more than predetermined minimum thickness at its approximate center, the coin will pass the test and the contacts 89, 90, will become engaged; however, the coin fails in such test if the lever 85 remains depressed for circuit-interrupting disengagement of the contacts 89, 90.

In like manner, the levers 92 each independently measure with their exploring points 94 the heighth or total thickness of the lowest point of the lateral side or marginal portions of the coin above the seat 105. If the coin is of less than predetermined maximum thickness, the coin will pass the test and the contacts 96, 97, of either or both of the levers 92 will remain engaged, however, again, the coin fails in such test if, and when both of the levers 92 are liftingly actuated for circuit-interrupting disengagement of the corresponding contacts 96, 97.

A weight 106 is slidably supported on and beneath the frame 70, and a suitably elongated screw 107 is rotarily mounted in the frame 70 for threadedly engaging the weight 106 for adjusting the same relatively to the pivotal axis of the frame 70 for counter-poising the frame for coin-weighing purposes.

The frame 70 also carries at its rear end a pivotally suspended link 108 depending into a vessel 109 supported on the shelf 22, the vessel 109 containing a fluid 110 of suitable viscosity, and the link 108 carrying a dasher or plate 111 working in the fluid 110 for dampening the oscillations of the frame 70, as best seen in Figure 8.

An arm 112, depending from one of the fulcrum-shafts 71 carries at its lower end a horizontally disposed elongated flexible "weighing" contact-member 113 of conducting material, suitably insulated from the arm 112 and having electrical connection with the balance-frame contact 91 by means of a conductor 114, as best seen in Figures 7 and 48.

Upstanding from the shelf 22 in the rear of the side-frames 25, is an insulation-block 115 supporting a forwardly projecting conducting bracket, in turn, supporting a stationary "ground" contact-point 116 disposed or spaced below the normal path of movement of the contact 113 occurring on swinging actuation of the arm 112 responsive to coin-weighing oscillation of the frame 70.

A lever 117, mounted on a shaft 118 supported in suitable bearings upstanding from the shelf 22, extends rearwardly below the main shaft 63 and carries at its free end an adjustable actuator-screw 119, the lever 117 being normally upwardly biased by a spring 120 engaged between the lever 117 and the shelf 22.

Fixed on the shaft 63, is a plate-cam 121 having a cam-tooth 122 engageable with the lever 117 during the coin-weighing oscillatory period of the frame 70 for causing the actuator-screw 119 to intersect the arcuate path of the swingable contact 113 and engage the same for depressing the contact 113 into engagement with the stationary contact 116, provided, however, that the contact 113 is in a particular position in its path corresponding to acceptable coin-weight oscillated position of the frame 70, as shown in Figure 8; otherwise the actuator screw 119 will fall to one or the other side of the contact 113 and the circuit connected thereto will remain interrupted, as will be understood from Figure 7.

The coin distributing mechanism of the machine includes a preferably cylindrical open-ended vertical coin-chute 123 supported from the frame-member 46 and disposed in coin-receptive position in front of and beneath the forward end of the balance-frame 70, the chute 123 preferably being equipped with opposingly spaced partitions 124 providing a diametrical coin-passageway therebetween.

A coin discharged into the chute 123 from the balance-frame 70 will be guided between the partitions 124 into a distributing-head 125 suitably supported in and by the front margin of the shelf 22. The head 125 includes a hopper 126 for initially receiving the coin from the chute 123, the bottom wall of the hopper being formed by a tiltable valve 127 mounted on a shaft 128 rotarily supported in and through the side walls of the head 125.

Opening through the front wall of the head 125, is a reject chute 129, and disposed suitably below the head 125 in registration with the chute 129, is a downwardly and forwardly inclined chute 130 mounted in and through the door 16 for termination in a tray 131 projecting forwardly therefrom immediately above the door or lid 8, as best seen in Figures 6 and 7.

Provided in the head 125 below the hopper 126, is a storage-hopper 132 whose bottom wall is formed by an oscillatory valve 133 mounted on a shaft 134 rotarily supported in and through the side walls of the head 125. Disposed below the head 125, is a coin-drawer 135 slidably mounted between the bracket members 5, which have suitable rearward prolongations 136 for such drawer-supporting purposes, all as best seen in Figures 1, 6, and 7.

The course of a coin through the distributing head 125 is determined in the first instance by the position of the valve 127. For such purpose, the shaft 128 of the valve 127 is provided with a crank 137 engaged by a spring 138 supported from an adjacent frame-member 25 for normally biasing the valve 127 in hopper-closing position for temporarily supporting a coin received from the chute 123, as best seen in Figure 5. However, for effecting distribution of a coin from the hopper 126, the valve 127 is actuable in alternative oppositely tilted directions by a selector mechanism, now to be described.

Mounted on the other end of the shaft 128, is a second crank 139 having its free end engaged in the slotted end of a lever 140 depending for oscillation from a pin 141 mounted suitably on the adjacent frame-member 25. On its rear face, the lever 140 carries a vertical pintle 142, on which is hingedly supported a C-shaped cam-follower 143 having a rearwardly extending pair of spaced upper and lower jaws 144, 145, respectively, as best seen in Figure 7.

The jaws 144, 145, are disposed for embracing a cam-drum 146 mounted on the shaft 63, the cam-drum 146 comprising a pair of axially spaced cam-tracks descriptively referred to as an outer or reject cam 147 and an inner or accept cam 148 with a short cylindrical or neutral section of the drum 146 therebetween, as will best be understood from Figure 49.

The cams 147, 148, are of the constant diameter type; thus, the reject-cam 147, which has a tooth 149 for engaging the jaw 145, is provided with a diametrically opposite notch 150 for receiving the jaw 144, and the accept cam 148, which has a tooth 151 for engaging the jaw 144, is provided with a diametrically opposite notch 152 for receiving the jaw 145. The teeth 149, 151, are on diametrically opposite sides of the drum 146, that is to say, the cams 147, 148, are 180° apart, as best seen in Figure 7.

The accept-cam 148 is further provided with a return cam-tooth 153, which, following the tooth 151, acts on the jaw 144 for throwing the follower 143 from the cam 148 onto the neutral portion of the drum 146, and, in turn, a "reject" shifter-cam tooth 154, mounted on the neutral portion of the drum 146 in advance of the tooth 151, normally acts on the jaw 144 for, in turn, throwing the follower 143 from the neutral drum-portion onto the reject-cam 147, as best seen in Figure 49.

Thus, under normal or "rejected" condition of the mechanism, the tooth 149 engages the jaw 145 for depressing the follower 143 for swinging the lever 140 forwardly about its pivot 141, thus tilting the valve 127 for discharging into the reject-chute 130 any coin contained at that time in the hopper 126, such coin, as will be understood, having been "rejected" by the gauging mechanisms of the machine due either or both to improper weight and dimensions.

However, on acceptance of a coin by the gauging mechanisms of the machine, a magnet 155, mounted suitably between the frame-members 25 above the main-shaft 63, at a suitable moment attracts an armature 156 upstanding from the upper follower-jaw 144 for shifting the follower 143 onto the accept-cam 148, whose tooth 151 then acts on the jaw 144 for lifting the follower 143 for swinging the lever 140 rearwardly about its pivot 141, thus tilting the valve 127 for discharging the "acceptable" coin from the hopper 126 into the subjacent storage-hopper 132, the jaw 144 thereafter being engaged by the cam-tooth 153 for restoring the follower 143 to initial position.

It will be seen that the valve 127 is actuated for coin distributing purposes during each coin-selecting cycle of operation of the machine. However, accepted coins thus deposited in the hopper 132 may accumulate therein subject to non-cyclic actuation of the valve 133, as will presently appear.

The mechanism for actuating the valve 133 includes a crank 157 mounted on an end of the valve-shaft 134 and pivotally connected by means of a link 157' with the free end of an armature 158 suitably suspended for oscillation from the under side of the shelf 22, the armature 158 being biased by means of a suitable tensional member or spring 158' for normally disposing the valve 133 in hopper-closing position. Likewise depending from the shelf 22, is a magnet 159, whose winding is suitably included in the electrical circuit of the vending apparatus, as will presently appear, for, at a suitable moment, attracting the armature 158 for tilting the valve 133 rearwardly, thereby discharging the coin or coins from the hopper 132 into the coin-drawer 135.

The valve 133 may be forwardly tilted, however, by means including a crank 160 mounted on the other end of the shaft 134 and terminating in an eye loosely embracing a horizontal rod or plunger 161 shiftably mounted in and through the adjacent pair of front and rear shelf-legs 23, 24, respectively. At its front end, the plunger 161 projects through an opening 161' suitably provided in the door 16 and carries a knob 162 disposed conveniently for customer's manipulation thereof, the door 16 carrying a plate 162' bearing the legend "Return" for directing the customer's attention to the plunger-knob 162, as best seen in Figures 6 and 27.

When the plunger 161 is inwardly shifted or manipulated, a collar 163 mounted on the plunger 161 is adapted for engaging the eye of the crank 160 for forwardly tilting the valve 133, thereby discharging the coin or coins from the hopper 132 into the chute 130 and tray 131 for return of such coins to the customer.

Referring again to the selector-magnet 155, energization of this magnet effects also actuation of a double-throw selector-switch B', included in the electrical circuit of the machine as presently appearing, and comprising a pair of upper and lower arms or poles 164, 165, respectively, and a spring switch-arm 166 therebetween, all of conducting material and suitably mounted on the insulation block 115 for projecting forwardly therefrom, the arm 166 being biased for normally engaging the lower pole 165, as best seen in Figures 5 and 7.

Mounted on the armature 156 of the magnet 155, is a cam-block or wedge 167 of insulation material. On attraction of the armature 156 toward the magnet 155, the wedge 167 is adapted for entering between the lower pole 165 and the arm 166 for disengaging the latter from the lower pole 165 and, in turn, effecting electrical contact of the arm 166 with the upper selector-switch pole 164, for a purpose presently appearing.

Also projecting forwardly from the insulation-block 115, is a series of single-throw spring switches 168, 169, 170, each comprising a pair of normally spaced resilient tongues or poles of conducting material, the respective switches 168, 169, 170, being connected in the electrical circuit of the machine in a manner presently appearing and being actuable for closing their respective circuits by means of suitable cams 171, 172, 173, also respectively, mounted on the main shaft 63, as best seen in Figure 5.

The apparatus for driving the selector-mechanism B includes a pair of front and rear bearings 174, 175, respectively, upstanding from the base 1 for rotarily supporting a drive-shaft 176 carrying at its rear end a pulley 177 having connection by means of a belt 178 with a suitable prime-mover preferably in the form of an electric-motor 179 mounted on a motor-shelf 179' disposed at a suitably elevated position on the rear corner-posts 3, as best seen in Figure 1.

Supported on the shaft 176, is a selector-clutch C, which comprises a sleeve 180 floating on the shaft 176 adjacent the rear bearing 174 and carrying a pulley 181 for engagement with the belt 69 of the selector-mechanism B, as best seen in Figure 16.

At its front end, the sleeve 180 terminates in a circular hub or clutch-head 182, to the peripheral margin of which is attached a pair of diametrically opposed forwardly projecting clutch poles or barrel-segments 183, between which is fitted an also diametrical core-piece 184 suitably apertured at its center for embracing the shaft 176. Mounted on the core-piece 184 and likewise apertured for receiving the shaft 176, is a rectangular spacer block 185, and suitably mounted on the core-piece 184 for engagement between the respective clutch-poles 183 and the spacer-block 185, is a pair of magnet-windings 186, the clutch poles 183 being in the magnetic circuit of the windings 186.

Provided in the end face of each of the clutch-poles 183, is an annular groove 187 for frictionally co-operating with a resilient friction-ring 188 mounted suitably on an armature disc 189 fixed on the shaft 176 a suitable distance forwardly from the ends of the clutch-poles 183 for normally providing an air-gap therebetween.

On energization of the magnets 186, the magnetic attraction between the ends of the clutch-poles 183 and the shaft-carried armature 189 effects axial movement of the clutch C slidably on the shaft 176 for shifting the clutch C toward the armature 189, thereby substantially closing the air-gap and thus suitably compressing the friction-ring 188 between the armature 189 and clutch-poles 183 for effecting clutch-driving co-action therebetween, as shown in Figure 16.

Mounted intermediately on the sleeve 180, is an insulation-disc 190 having suitably embedded in its forward face a pair of annular inner and outer conducting slip-rings 191, 192, respectively, comprising the respective terminals of the magnet windings 186, with which the slip-rings 191, 192, are connected by suitable conductors as shown.

Mounted on a suitable support 193 upstanding from the frame-base 1, is an insulation switch-block 194, upstanding from which is a series of four switch-blades 195, 196, 197, 198, of conductive and resilient or spring-material, each of said blades being attached to the block 194 by means of an arched foot 199 integrally united to the corresponding blade with a rounded heel 200 rockably seated on the block 194, the foot 199, at its free end or toe being also engaged with the block 194 and rigidly secured thereto by means of a toe-anchor or fastener element 201.

At its crown, the arched-foot 199 is engaged by a depending crown-anchor or fastening element 202 having threaded engagement with the block 194 for adjusting or flexing the foot-arch 199 to more or less heighth above the block 194 for correspondingly rocking the particular foot-connected blade on its heel 200, thereby, in turn, adjustably swinging the upper end of the blade in rearward or forward direction, as will be understood from Figure 16.

The switch blades 195, 196, are disposed on opposite sides of the shaft 174 and carry respective contact-blocks or so-called carbon-brushes 203, 204, respectively, the brush 203 of the blade 195 having sliding engagement with the inner slip-ring 191, and the brush 204 of the blade 196 slidingly engaging the slip-ring 192 diametrically oppositely on the disc 190 from the brush 203. The blades 195, 196, are resiliently tensed in co-operation with the disc 190 for normally biasing the clutch C in rearwardly shifted axial movement for disengagement thereof from the clutch disc 189.

The blades 197, 198, are disposed in lateral adjacence to the blade 196, and the latter is prolonged above its carried brush 204 for vibration of the free or swingable end of the blade 196 between spaced front and rear arms, respectively, laterally projecting from the blades 197, 198, as best seen in Figure 18.

Normally the blade 196 contacts the arm of the rear blade 198, a suitable stop 204' being mounted on the block 194 for impingement by the clutch-head 182 for limiting the rearward or releasing movement of the clutch C on the shaft 176. However, on forward axially shifting movement of the clutch C for engaging the clutch armature 189, the upper end of the blade 196 is swung correspondingly forwardly for disengaging the blade 198 and, in turn, engaging the arm of the front blade 197, as best seen in Figure 16.

In the upper portion of the control-section A, is a pair of brackets 205, which project rearwardly from the respective front corner-posts 2 at a suitable elevation above the coin-selecting mechanism B and carry a shelf 206, on which is mounted the base member 207 of a so-called mechanical accounting mechanism D.

The base member 207 carries a pair of spaced upstanding front and rear bearing-standards 208, 209, respectively, through which is mounted, for both rotary and axially shiftable movement therein, a ratchet-shaft 210 carrying a ratchet-wheel 211, as best seen in Figures 21 to 25, inclusive.

Disposed in the diametrical plane, and on the respective opposite sides, of the ratchet-wheel 211, is a pair of vertically disposed oscillatory armatures 212, 213, each pivotally supported at its lower end in a suitable bearing provided on the base 207 for swingable actuation of their respective upper ends toward and from the ratchet-wheel 211.

The armature 212, which will be referred to as the accumulator-armature, has magnetic co-operation with an accumulator-magnet 214 supported on a suitable bracket upstanding from the base 207. The frame of the magnet 214 includes a horizontal pole-piece 215, which, extending over the magnet winding 214, is endwise disposed in registration with the swingable upper end of the armature 212.

Similarly, the armature 213, which will be referred to as the subtractor-armature, has magnetic co-operation with a subtractor-magnet 216 likewise suitably supported from the base 207. The frame of the magnet 216 also includes a horizontal pole piece 217 which is endwise disposed in registration with the swingable upper end of the armature 213, as shown in Figure 21.

Mounted on the accumulator-magnet pole-piece 215, is an abutment-member or bar 218 projecting over the ratchet-wheel 211, and similarly mounted on the subtractor-magnet pole-piece 217, is an abutment-member or bar 219 endwise spaced from the abutment 218, providing a gap therebetween for a purpose soon appearing, and as best also seen in Figure 21.

A pawl-carrying lever 220 is pivotally mounted on the swingable end of the accumulator-armature 212 for projecting over the ratchet-wheel 211, the lever 220 carrying a depending pawl 221 co-operable with successive ratchet-teeth of the wheel 211 for effecting step-by-step rotation thereof on also successive magentically actuated advances of the accumulator armature 212 toward the magnet 214, as will presently appear.

The lever 220 is normally biased by means of a suitable tensional member or spring 222 for engaging the pawl 221 with the ratchet-wheel 211. The armature 212 is also normally biased by a tensional member or spring 223 toward the wheel 211, in retracted position from the magnet 214, for disposing the pawl 221 in substantially overlapping relation with respect to the next presented tooth of the wheel 211 to be engaged by the pawl on the succeeding stroke of the armature 212. The armature 212 is provided with a foot 224 co-operable with stop 225 on the base 207 for limiting such spring-biased movement of the armature, as best seen in Figure 21.

At its free end, the lever 220 is provided with an upturned end or cam-portion 226 movable into the gap between the abutments 218, 219, for engagement with the opposing nose or end of the abutment 219 on such spring-biased retraction of the armature 212 from the magnet 214, for disposing the lever 220 in "idle" position, the lever 220 being then lifted against the spring 222 for normally spacing the pawl 221 substantially from the path of the teeth of the ratchet-wheel 211. However, the cam-end 226 is formed for, on advance of the armature 212 toward the magnet 214, permitting the lever 220, under bias of the spring 222, to drop again into the path of the ratchet-teeth of the wheel 211 for engaging the next presented tooth thereof.

The lever 220 is further provided intermediate its ends with an upturned bend or cam-portion 227 co-operable with the nose or end of the other abutment 218 for, in a positive manner, depressing the lever 220 for restoring the same to operative position on magnetic actuation thereof, as will be understood from Figure 21.

Mounted on the shaft 210, is a combined expansile and torsional spring 228 having its one end fixed to the wheel 211 and its other end engaging the bearing-standard 208. The torsional characteristic of the spring 228 serves for normally biasing the wheel 211 in rotatory or subtractive movement reversely to accumulative movement imparted to the wheel by actuation of the accumulator armature 212. The ratchet-wheel 211, however, is normally prevented from freely responding to subtractive bias of the spring 228 by means of a pair of upper and lower pallets 229, 230, respectively, mounted on the subtractor-armature 213 for oscillation therewith.

The subtractor-armature 213 is normally biased by a tensional member or spring 231 also toward the wheel 211 in retracted position from the subtractor-magnet 216 for yieldingly engaging the upper pallet 229 with the wheel 211, which latter is then latched against retrograde or subtractive rotatory movement, the lower pallet 230 also co-operating with the stop 225 for limiting the ratchet-latching spring-biased movement of the armature 213.

However, the pallets 229, 230, comprise, in co-operation with successive pairs of teeth of the wheel 211, an escapement for effecting step-by-step retrograde subtractive movement of the wheel 211 on successive magnetically actuated movements of the armature 213 toward the subtractor magnet 216, in a manner substantially similar to that effected by oscillation of a clock-escapement mechanism.

At its front end, the ratchet-shaft 210 projects beyond the bearing 208 and carries a hub 232, which, in turn, supports a circular segment or indicator-disc 233 provided adjacent its circumferential margin with an arcuate series of stencil or cut-out indicia 234 comprising, in the present instance, a sequence of numerals consecutively from one to ten, inclusive, as best seen in Figure 2.

Mounted underneath the shaft 206, is a housing 235 enclosing a lamp 236, the housing being open at its front end for focusing the rays of the lamp 236 upon a suitably restricted area of the circumferential margin of the dial 233, as best seen in Figures 2 and 25.

Normally the rays from the lamp 236 impinge a solid portion of the dial 233 corresponding to the naught (0) position of sequence of numbers thereon. However, on successive step-by-step accumulative actuations of the wheel 211 by the accumulator-magnet 214, rotatory movement of the dial 233 follows for bringing the stencil-numerals 234 in sequence into registration with the lamp 236 for transillumination of each particular stencil 234 for casting number-images of successively increasing numerical values on a ground-glass or translucent screen 237 mounted in a suitable aperture in the door 16, the latter also carrying a suitable legend 238 bearing the indicia "credit", as shown in Figure 27.

Conversely, subtractive rotation of the ratchet 211, effected on escapement actuation of the pallets 229, 230, by the subtractor magnet 216, effects reverse rotation of the dial 233 for bringing the stencil-numerals 234 in sequence into registration with the lamp 236 for casting number-images of successively decreasing numerical values upon the screen 237, for purposes presently appearing.

Operably associated with the accounting-mechanism D, is a multi-pole switch D' comprising a rotary insulation hub 239 mounted on the shaft 210 in rear of the ratchet 211. On the hub 239, is mounted a conducting disc 240 provided with a circumferentially projecting segment or rotor contactor 241, which merges into the disc 240 with shoulders 242, one of which is adapted, at "zero" position of the shaft 210, for impinging a horizontal stop-bar 243, best seen in Figure 23.

Mounted suitably on the rear bearing-standard 209, is a stationary insulation disc 244 carrying a plurality of circumferentially spaced contact-fingers or poles 245 projecting forwardly from the disc 244 for overhanging the path of movement of the contact-rotor 241, which is adapted for progressive engagement with the poles 245 as it is rotated in step-by-step movement responsively to accumulative rotatory actuation of the wheel 211 by the accumulator magnet 214, as will be understood from Figure 23.

Conversely the poles 245 are progressively disengaged from the rotor 241 as the same is subtractively or reversely actuated responsively to escapement actuation of the wheel 211 by the subtractor-magnet 216.

In the present instance, there are eleven poles or fingers 245, respectively identified as $a$, $b$, $c$, $d$, $e$, $f$, $g$, $h$, $i$, $j$, and $k$, and adapted for engagement by the rotor 241 in the order named, the rotor 241 normally being in retracted "pole-position" for engaging merely the first pole $a$, as shown in Figure 26, such position of the rotor 241 corresponding to the "zero" or normal position of the vane 233, as shown in Figure 2.

The respective poles $b$, $c$, $d$, etc., in the order named, are successively engaged by the rotor 241 as the also respective numerical-stencils 234 are successively brought into the focus of lamp 236, that is to say, the rotor 241 will be in pole-position for "bridging" the poles $a$ and $b$ when the stencil "1" is illuminated, the rotor 241 will be advanced to pole-position for bridging the poles $a$, $b$, $c$, when the stencil "2" is illuminated, and so on, the rotor 241 being in fully advanced pole-position for engaging all the poles $a$ to $k$, inclusive, when the stencil "10" is illuminated.

At its rear end, the ratchet shaft 210 impinges a ball 246 slidable in the bore of a barrel 247, a compressile member or spring 248 being seated between the end wall of the bore of the barrel and the ball 246 for axially yielding telescopic co-operation of the shaft 210 with the barrel 247, as best seen in Figure 25.

The barrel 247 is equipped with a suitable eye having pivotal connection, as at 249, with the upper bifurcated end of a vertical lever 250, as best seen in Figure 25, the lever 250 being intermediately oscillatorily supported, as at 251, on the motor-shelf 179'. At its lower end, the lever 250 has suitable operative connection, as at 252, with the rear end of the plunger 161, as best seen in Figure 1.

It may here be said, briefly, that for each coin or unit value deposited in the storage hopper 132, the accounting ratchet-wheel 211 is advanced one step by the accumulator magnet 214 for cumulatively tallying or counting the coins, values, or items, as may be said, accepted by the machine. However, if the coins are returned to the customer by manipulation of the plunger 161, the lever 250 will be oscillated for axially shifting the shaft 210 forwardly for disengaging the wheel 211 from the pallet 229, as shown by dot-dash lines in Figure 25, the spring 228 then by its torsional characteristic reverting the wheel 211 to "zero" or normal position, the shoulder 242 of the contact-segment 241 meanwhile impinging the stop 243. On release of the plunger 161, the spring 228, by its extensile characteristic, reversely shifts the shaft 210 for disposing the wheel 211 again in position for re-engagement by the pallet 229, the shoulders 242 sliding meanwhile on the stop 243.

Suitably bracketed from one of the front corner-posts 2, below the accounting mechanism D, is a lamp 253 disposed for illumination, on presently appearing occasions of operation of the machine, of a screen 254 mounted in the door 16, the screen 254 bearing suitable indicia comprising the word "rejected", as indicated by dotted lines in Figure 27.

Mounted also on one of the posts 2, is a suitable push-button switch 255, accessible through a suitable aperture in the door 16, the latter carrying a plate 256 bearing the legend "Start", as best also seen in Figure 27.

Referring now to the vending mechanism of the machine, in Figure 27, E, E, E' designate a series of substantially similar merchandise-dispensing or vending sections arranged in row-relation with the section A and operatively associated therewith, as shortly appearing. Each of the sections E and E' is employed for vending a particular kind of merchandise; hence the number of such sections in the row will depend upon the merchandising requirements of the merchant or other user. Preferably the associated sections A, E, E' are mounted or assembled in unitary relation and housed in a suitable enclosure, not shown, as a cabinet, a niche in a wall, or the like.

The section E' is the terminal section farthest from the section A and for descriptive purposes will be referred to as at the "foot" of the row. Similarly the particular section E immediately adjacent the section A will be referred to as at the "head" of the row of vending sections. The other section or sections E will be described as on the "foot" side of the "head" section E and as on the "head" side of the "foot" section E'.

The main frame of each of the vending sections E, E' comprises a base 1', front and rear corner-posts 2', 3', connected by the top frame 4', and brackets 5' projecting from the posts 2', the brackets 5' being connected by cross-bars 6', 7'. Mounted on such framework, is a lid 8' and lower door 12', equipped for lockable co-operation substantially as described for the doors 8 and 12. There is also provided an upper door 16' mounted similarly to the door 16 and surrounded by casing-strips 19', 20', all such several parts being substantially similar in form and function to like parts heretofore described, with such minor exceptions as will readily appear from the drawings.

As has been said, the sections A, E, E' are assembled in aligned row relation and secured together in unitary manner by suitable fastening-elements 257, respectively engaging contiguous pairs of the frame corner-posts 2, 2', 3, 3', as the case may be and as will be understood from Figure 3.

Extending lengthwise of and through the row of sections A, E, E' below the brackets 5, 5', is a vending-drive shaft 258 rotarily supported in suitable-bearing standards 259 upstanding from the bases 1, 1'. The shaft 258 extends under the selector-drive shaft 176 in the section A, from which shaft 176 the shaft 258 is driven at a suitably reduced speed by means of a worm-and-gear arrangement 260, as best seen in Figures 1 and 2.

It may here be said that, the sections E, E' being mechanically alike, the ensuing description of the several mechanisms of a particular section E will suffice for all of the vending sections.

Mounted on the shaft 258, preferably adjacent the bearing 259, is a sprocket-pinion 261 having operative connection, as by a chain 262, with a sprocket-gear 263 mounted on a clutch-shaft 264 rotatable in unison with and at a reduced speed relatively to the shaft 258 and supported in suitable bearings 265 by and between the front corner posts 2', as best seen in Figures 3, 4, and 28.

Mounted on the shaft 264, is a magnetic-clutching apparatus hereinafter referred to as the vending-clutch F. With certain modifications as presently appearing, the vending-clutch F is substantially similar to the selector-clutch C, the clutch F comprising a sleeve 180' floating on the shaft 264 and carrying a head 182', clutch-poles 183', core-piece 184', spacer block 185', and magnet-windings 186', all similar in form and function to like parts previously described.

Likewise, mounted on the base 1', is a sub-base 266 carrying a switch-block 194' supporting a series of switch-blades 195', 196', 197', 198', the blades 195', 196' carrying brushes 203', 204', respectively, for co-operation with slip-rings 191', 192' mounted on the insulation disc 190'. The blades 197', 198', in turn, have switching co-operation with the blade 196', and the blades 195', 196', 197', 198', are adjustably mounted on the block 194' similarly as described for the blades 195, 196, 197, 198, all such several parts being likewise similar in form and function to like parts as hereinbefore fully set forth.

Mounted on a radial face of one of the clutch-poles 183', is a dog 267 for one-way clutch-engagement with an annular series of teeth 268 provided on the opposing face of a clutch-armature-disc 269, the latter being fixed on the shaft 264 a suitable distance from the ends of the clutch-poles 183' for providing an air-gap therebetween and, also, normally affording clutch-disengaging clearance between the dog 267 and the teeth 268.

However, on energization of the magnets 186', the magnetic attraction between the clutch poles 183' and the armature disc 269 effects axially-shifting movement of the clutch F on the shaft 264 toward the shaft-carried armature 269 for substantially closing the air-gap and engaging the dog 267 with a particular tooth 268 for clutch-driving co-action therebetween, as shown in Figure 28.

Preferably, for effecting quiet operation of the clutch mechanism F, a bumper-ring 270 of resilient material, as soft rubber or the like, is suitably fitted between the ends of the clutch-poles 183' and the clutch armature 269, as best also seen in Figure 28.

Upstanding from the sub-base 266 on the respective opposite sides of the clutch F, is a pair of stop-pins 271, and diametrically projecting from the clutch-head 182', is a corresponding pair of stop-lugs 272, 273, respectively, engageable with the respective stop-pins 271 when the clutch F is in clutch-disengaged position for, at such time, locking the clutch F and its associated parts against rotation. However, on axially shifting movement of the clutch F to clutch-engaged position, the lugs 272, 273, are shifted out of registration with the stop-pins 271, thus permitting rotation of the clutch F, as best seen in Figures 28 and 33.

Suitably upstanding from a second sub-base 274 mounted on the base 1', is a pintle-block 275, on which is rotarily mounted a vertical swivel-post 276 carrying at its upper end a lateral arm 277, which, in turn, supports at its free end a vertically arcuate armature 278 disposed adjacent the path of movement of the clutch-poles 183', as best seen in Figure 28.

Near its lower end, the swivel-post 276 carries an arm 279 swingable between a pair of spaced stop-pins 280, 281, respectively. A torsional spring 282 is wrapped around and suitably secured at an end to the base of the pintle 275, the spring 282 at its free end being engaged with the arm 279 for normally biasing the same on the stop-pin 280. In such biased position, the arm 277 is disposed approximately parallel with the axis of the clutch F with the armature 278 substantially spaced from the periphery of the clutch-poles 183'.

Mounted on the clutch-lug 272, is a shoe 283 disposed for registration with the arm 277 when the latter is in normal position, the arm 277 at an end being provided with a cam-face 284 for co-action with the shoe 283 on termination of a revolution of the clutch F for axially shifting the same from engaged to disengaged position for again seating the lugs 272, 273, on the respective stop-pins 271, as shown in Figures 38 and 39.

However, on energization of the magnets 186' the armature 278 is attracted toward the adjacent clutch-poles 183' for swinging the arm 277 inwardly, thereby permitting the thus releasing the shoe 283 for movement thereof past the arm 277, clutch F to axially shift to engaged position, the arm 279 meanwhile impinging the stop-pin 281 for preventing contact of the armature 278 with the clutch proper, as best seen in Figure 28.

Quilled on the shaft 264 between the clutch disc 269 and sprocket 263, is a multi-pole subtractor switch-mechanism G comprising a sleeve 285 carrying at its end, adjacent the disc 269, an arm 286 engaging a notched dog 287 projecting suitably for the purpose from one of the clutch-poles 183', whereby revolution of the clutch F effects also revolution of the subtractor-switch G.

The sleeve 285 at its end adjacent the sprocket 263 carries a suitably mounted insulation disc 288, which, in turn, carries an annular controller-switch ring or rotor 289 of conducting material. Proceeding in the direction of its rotation, that is, clockwise, as seen in Figure 30, the rotor 289 is provided with a peripheral recess or clutch-cut-off notch 290, followed by a peripheral projection or a ground-cut-off contact-lug 291, and adjacent the latter contact is a further peripherally projecting subtractor-contact-lug 292, as best seen in Figure 30.

Mounted on the base 1', is a sub-base 293 having an upstanding standard 294 supporting, in turn, a stationary insulation disc 295 confronting the controller rotor 289. Mounted on the periphery of the disc 295, is a series of circumferentially spaced contact-members comprising also in the direction of revolution of the rotor 289, a clutch-ground contact 296 having permanent sliding engagement with the rotor 289, followed by a clutch-cut-off finger 297 normally disposed in the notch 290, and spaced from the latter finger is a ground cut-off finger 298 normally in engagement with the contact 291. Next succeeding the finger 298, is a coin-release finger 299 adapted for engagement by the contact 292, all such several fingers extending from the rim of the disc 295 on the side thereof adjacent the rotor 289, as shown by dotted lines in Figure 30.

However, following the finger 299, is a series of contact-members or poles 300, which integrally extend on both sides of the disc 295, as shown by solid lines in Figure 30. The particular fingers of the respective poles 300 which extend from the rim of the disc 295 adjacent the rotor 289 are adapted for successive engagement, one only at a time, by the contact 292 on revolution of the rotor 289 by and with the clutch F. In the present instance, there are ten such contact members 300, respectively identified as the poles $b'$, $c'$, $d'$, $e'$, $f'$, $g'$, $h'$, $i'$, $j'$, and $k'$, and adapted for engagement by the contact 292 in the order named.

As has been said, the poles 300 extend from the rim of the disc 295 to the side thereof oppositely from the rotor 289. Also extending only on such latter side of the disc 295, is a subtractor-magnet finger 301 disposed between the fingers 297, 298, as will be understood also from Figure 30.

Co-operating with the subtractor-switch G, is a so-called pricing switch G' including a contact segment 302, which, as best seen in Figure 32, has permanent sliding engagement with the contact-finger 301. The segment 302 is of conducting material and is mounted on an insulation disc 303 mounted, in turn, on a metallic-hub 304 freely rotatable on the shaft 264 adjacent the stationary disc 295. The hub 304 carries a radially projecting handle or price-indexing lever 305 of resilient material, provided with a catch 306 for selective engagement with respective notches 307 provided in an arcuate price-indexing bar 308 supported from the disc 295 as by suitable angle-brackets 309 engaging the periphery thereof, as seen in Figure 29.

There are ten of the notches 307, and the bar 308 bears suitable indicia opposite each notch for identifying the same, the series of notches 307 being numbered "10", "20", "30", "40", "50", "60", "70", "80", "90", "100", respectively, as seen in Figure 28. The handle 305 is adapted to be latchingly disposed or indexed opposite the respective notches 307 in the order named for in like order progressively engaging the segment 302 with the respective poles $b'$, $c'$, $d'$, $e'$, $f'$, $g'$, $h'$, $i'$, $j'$, and $k'$, the segment 302 being normally in engagement with merely the first pole $b'$ for connecting the same with the finger 301.

The respective succeeding poles $c'$, $d'$, $e'$, etc., are successively engaged by the segment 302 as the handle 305 is positioned opposite the successive notches 307, that is to say, the segment will connect the finger 301 with the poles $a'$ and $b'$ when the handle 305 is opposite the notch "20"; the fingers 301, $a'$, $b'$ and $c'$ will be connected when the handle 305 is opposite the notch "30", and so on, all the fingers 301 and $a'$ to $k'$, inclusive, being connected by the segment 302 when the handle 305 is opposite the notch "100".

Also mounted on the hub 304, is an insulation disc 310 carrying a conducting contact-segment 311 having permanent sliding engagement with a contact-finger 312 mounted on the periphery of a stationary insulation disc 313 supported by a standard 314 also upstanding from the sub-base 293, as best seen in Figures 29 and 31.

The segment 311 carries a peripherally projecting contact-lug 315 adapted, on indexing manipulation of the handle 305, for successively engaging, one only at a time, a series of contact members or poles 316 mounted in a circumferential series on the disc 313, as best seen in Figure 29.

There are ten of the contact members 316, respectively identified as the poles $b''$, $c''$, $d''$, $e''$, $f''$, $g''$, $h''$, $i''$, $j''$, and $k''$, and adapted for engagement by the contact 315 in the order named, the contact 315 being normally in pole position for engaging the finger $b''$, that is to say, when the segment 302 is likewise in normal engagement with the finger $b'$ of the series of pole-fingers 300. Similarly, when the segment 302 is advanced to pole-position for engaging the pole $c'$, the contact 315 will engage the pole $c''$ for connecting the same with the finger 311, the pole $b''$ being meanwhile disengaged by the contact 315, and so on for all of the contact-poles 316, the pole $k''$ being engaged by the contact 315 and all the other poles of the series of contacts 316 being disengaged from the contact 315 when the segment 302 is advanced for engaging the corresponding pole $k'$ of the series of contacts 300. It will be understood, however, that there is no electrical connection between the poles 300 and 316.

H designates the article dispensing apparatus of the machine, which is disposed upstandingly in the space between the corner posts 2', 3'. The frame of the article dispensing apparatus H comprises lower and upper pairs of transversely spaced bearing-supports 317, 318, respectively, each supported by and between a respective pair of front and rear corner-posts 2', 3'. Upstanding from the lower supports 317, are front and rear pairs of inwardly oblique brackets 319, 320, respectively, and similarly depending from the upper supports 318 in respective registration with the brackets 319, 320, are front and rear pairs of inwardly oblique brackets 321, 322, also respectively.

Mounted between the respective pairs of registering upper and lower front brackets 319, 321, is a transversely spaced pair of vertical roller-track guides or channel bars 323, and similarly mounted between the respective pairs of registering upper and lower rear brackets 320, 322, is a transversely spaced pair of vertical roller-track guides 324, as best seen in Figure 3.

The pair of lower supports 317 are respectively provided with a vertical slot 325 in which is slidably mounted a bearing block 326 vertically adjustable in the slot 325 by means of suitably opposed screws 327. Journaled in and between the pair of bearing-blocks 326, is a conveyor-drive shaft 328 carrying adjacent one of its ends a sprocket-wheel 329 having operative connection, by means of a suitable chain 330, with a sprocket-pinion 331 mounted on the free end of the clutch-quill 180' for actuation of the shaft 328 by and with the clutch F, as best seen in Figure 28.

In like manner, the pair of upper supports 318 are respectively provided with a vertical slot 325 equipped with a bearing-block 326 and adjusting screws 327 for rotarily supporting in and between the pair of blocks 326 a head-shaft 332. Mounted in vertical registration on the shafts 328, 332, are respective pairs of transversely spaced upper and lower conveyor-sprockets 333, 334, also respectively, each of the sprockets 333, 334, comprising a circular-member or wheel having in its rim a series of circumferentially spaced roller-receptive pockets 335 each closed at its outer end by a disc-like projection or end-wall 336, as best seen in Figure 3.

Trained over the respective pairs of sprockets 333, 334, is a continuous tray conveyer of the vertical elevator type comprising an articulated series of tray-members 337, each tray 337 including integrally formed parallel sides 338 having the same depth as that of the trays 337. At their inside tray-adjacent corners, the respective sides 338 are pivotally engaged, as at 339, by a through-rod or pintle 340. At their free ends, the sides 338 are outwardly offset, as at 341, and are also pivotally engaged, as at 342, with the corresponding pintle-rod 340 of the next adjacent tray of the series, as best seen in Figure 14.

Each pintle-rod 340 at its respective opposite ends carries a roller 343 for traversing the adjacent channel guide 323 or 324, as the case may be, the front run of the series of trays 337 moving downwardly between the guides 323 with the tray sides 338 pointed downwardly, and the rear run of the tray-series conversely moving upwardly between the guides 324 with the tray-sides pointed upwardly, as best seen in Figures 3 and 4.

In passing from their front to rear runs, the series of trays 337 move between the lower sprockets 334 and an arcuate or curved boot-plate 344 suitably supported on the base 1', merely a small operative clearance being provided between the boot 344 and the peripheral path of the trays 337 and their sides 338. Meanwhile the rollers 343 engage the successive pockets of the sprocket 334 for driving actuation of the series of trays 337, the pocket-end closure-discs 336 serving for laterally guiding the trays 337 during their movement around the sprockets 334.

Similarly, on emerging from the rear guides 324, the rollers 343 engage successive pockets 335 of the upper sprockets 333 for guiding the trays 337 thereover, the tray-sides 338 meanwhile resting on the successive flat sides or walls of a polygonal drum 345 mounted between the sprockets 333. On discharge from the sprockets 333, the rollers 343 engage suitable track-shoes 346 for guiding the rollers to the guides 323, the shoes 346 merging into a back-plate 347 spanning across the back-sides of the guides 323, all as best seen in Figure 3.

Projecting rearwardly from the cross-member 7', is a delivery shelf 348 disposed flush with the lid or door 8'. The upper door 16' carries an inwardly projecting box 349 having outwardly flaring top and side walls as shown, the front of the box 349 opening through the door 16'. When the door 16' is closed, the bottom wall of the box 349 is formed by the shelf 348 and the rear of the box opens toward the series of trays 337, as best seen in Figure 3.

The drive-connection between the clutch F and dispensing mechanism H is such that, when the lugs 272, 273, are engaged with the respective stop-pins 271, a particular tray 337 will be disposed flush with the shelf 348. The ratio of the drive sprockets 329, 331, is likewise such that each revolution of the clutch F will advance the series of trays 337 one tray distance for successively bringing the respective trays 337 into registration with the shelf 348.

A shaft 350 is mounted for oscillation in and transversely between respective bearings 351 rearwardly projecting from the brackets 319. On the shaft 350, is mounted a centrally disposed hub 352 carrying an upstanding vibrator lever 353, on the free end of which is pivotally mounted one end of an arm 354 normally projecting forwardly from the lever 353, the latter having a stop-lug 355 for engaging the shank of the arm 354 for also normally disposing the same approximately right-angularly to the lever 353.

The arm 354 at its other end pivotally supports a pusher or discharge-plate 356 carrying at its upper margin a lug 357, between which and the opposite end of the arm 354 is engaged a spring 358 for normally biasing the lug 357 on the shank of the arm 354 for disposing the plate 356 obliquely thereto, the plate 356 at its lower margin carrying a pair of rearwardly projecting feet 359 extending at an acute angle to the plate 356, as best seen in Figures 3 and 14.

Mounted on the respective opposite ends of the shaft 350, are forwardly projecting cams or dogs 360 for engagement by a particular pair of rollers 343 emerging from the lower end of the guides 323. Such engagement of the dogs 360 by the rollers 343 effects oscillation of the shaft 350 for swinging the lever 353 forwardly toward the front run of the trays 337 for movement of the arm carried pusher plate 356 to and between a particular descending pair of the trays 337.

At the conclusion of said tray-movement, the dogs 360 remain normally in engagement with the particular pair of rollers 343, as shown in Figure 15, for finally disposing the lever 353 in approximately vertical position, with the plate 356 advanced toward the front margin of the particular tray 337 then disposed opposite the shelf 348, and the plate-feet 359 residing on the top-face of the tray.

The plate 356 thus effects substantial closure of the front end opening of the tray 337 for preventing unauthorized access through the box 349 into the mechanism H, the plate 356 being normally locked, as may be said, in such tray-closing position by the engagement of the dogs 360 with the rollers 343 of the series of trays 337, and the latter being likewise locked against movement by the engagement of the clutch-lugs 272, 273, with the stops 271.

Suitably mounted on an arm projecting rearwardly from the hub 352, is a weight 361, and provided on each of the dogs 360, is a suitable boss 362 engageable with a stop-lug 363 projecting from the adjacent bracket 319, as best seen in Figure 15. On initial vending movement of the trays 337, the dogs 360 are disengaged by the particular pair of rollers 343 for releasing the shaft 350 for rotatory actuation thereof by the weight 361, whereby the lever 353 is swung rearwardly for withdrawing the pusher plate 356 from the path of movement of the front run of the trays 337, the bosses 362 meanwhile impinging the stop 363 for retaining the lever 353 in rearwardly oblique position between the front and rear runs of the trays 337, as shown by dot-dash lines as I in Figure 3.

As the vending movement of the trays continues, the next succeeding tray 337 moves downwardly past the so-rearwardly swung plate 356, whereupon the dogs 360 are again engaged by a pair of rollers 343 for moving the plate 356 over the last-mentioned tray 337 for discharging any tray-supported article, as 364, from the tray onto the shelf 348 accessibly for customer's removal of the article through the box 349, as will also be understood from Figure 3.

During such article-discharging movement of the plate 356, the same may oscillate more or less on the arm 354 for firmly engaging the article, the plate 356 being restored by the spring 358 to normal oblique position after removal of the discharged article.

The plate 356 may, on certain presently appearing occasions of the operation of the machine, be rendered in-operative for article-discharging purposes by merely swinging the arm 354 upwardly and over the end of the lever 353, the plate 356 then depending on the rear side of the lever 353, as shown by dot-dash lines II in Figure 3.

K designates a change-making mechanism comprising a bracket 365 mounted on an adjacent front corner-post 2' for supporting a guide-block 366 suitably bored for slidably supporting a vertical coin-tube 367 open at its opposite ends and disposed for vertical registration with a coin-rest or supporting block 368 carried by a transverse yoke or stirrup 369 depending from the guide-block 366, as best seen in Figures 40 to 45, inclusive.

Vertically shiftable between the legs of the stirrup 369, is a floating-frame 370 apertured for receiving the lower end of the tube 367. At its front end, the frame 370 is vertically split and provided with forwardly projecting complementary lugs 371 co-operably engaged by a clamping screw 372 for gripping the tube 367 adjustably in the frame 370.

On the opposite sides of the frame 370, are respective pins or studs 373 projecting into slots 374 provided in the corresponding vertical legs of the stirrup 369. Other studs 375 are mounted in suitable recesses 376 provided in the guide-block 366 in registration with the slots 374, and resilient hangers or coil-springs 377 are engaged between the respective pairs of upper and lower studs 375, 373, thus yieldingly biasing the frame 370 upwardly upon the block 366 for correspondingly spacing the lower end of the tube 367 from the coin-seat 368.

Rotarily supported on a stud 378 projecting suitably from the front face of the block 366, is a cam-wheel or disc 379 of generally circular contour and having rimwise engagement with the pair of lugs 371 on the frame 370 for shifting the same downwardly in the stirrup 369, so that the bottom of the coin-tube 367 is seated upon the upper face of the coin rest 368.

At a particular point on its periphery, however, the cam-disc 379 is suitably flattened providing a seat 380, which, on suitable manipulation of the cam 379, may be brought into registration with the lugs 371, thus allowing the frame 370 to be lifted by the springs 377 for spacing the bottom of the tube 367 from the plane of the coin-seat 368 a distance equal to the thickness of a coin, as 381, of the particular denomination contained or stacked in the tube.

In the present instance the coin 381 comprises a nickel or five-cent piece, and, as best seen in Figure 41, the circumferential margin of the disc 379 is marked or indexed opposite the seat 380 with a suitable indicia "5" for indicating that, when the indicia "5" is opposite the lugs 371, the apparatus is set for delivering "five" cents in change. Also suitably circumferentially spaced on the disc 379 from the indicia "5", is a second indicia "0" for indicating that, when the indicia "0" is opposite the lugs 371, the apparatus is inoperative for change-making purposes.

The frame 370 projects rearwardly from the block 366 and is provided with a longitudinal rectangular bore or way 382 open at its front end and extending under and communicating with the lower end of the tube 367. The width of the way 382 is substantially equal to or greater than the inside diameter of the tube 367, and the coin-rest 368 projects into the way 382 through a suitable aperture provided in the bottom wall thereof. The width of the rest 368 is substantially less than that of its supported coin 381, providing opposite channels 383 between the coin-rest 368 and the respective side-walls of the way 382, whereby a coin 381 residing on the rest 368 will marginally overhang the channels 383, as best seen in Figure 44.

Slidable in the respective channels 383, is a pair of coin-pusher fingers or bars 384 projecting forwardly from a slide-block 385 reciprocably mounted in the way 382, the upper faces of the fingers 384 being flush with the under face of the coin tube 367 for movement under the opposite side segments thereof as will presently appear.

Projecting upwardly and rearwardly from the guide block 366, is a bracket 386 having at its rear end an eye in which is engaged a pin 387 (the eye of the bracket is broken away in Figure 42). Pivotally depending from the pin 387 for oscillation in a slot 388 provided longitudinally in the upper wall of the way 382, is a lever 389 terminating in a ball-end working in an eye 390 provided in the slide 385.

Extending forwardly from the hub of the lever 389, is an offset arm 391, between which and the bracket 386 is a spring 392 normally biasing the slide 385 in rearwardly shifted position in the way 382 for retracting the fingers 384 substantially from under the column or stack of coins in the tube 367 so that the same may normally be supported on and by the coin-rest 368.

A second arm or dog 393 extends rearwardly from the hub of the lever 389, the arm 393 being suitably laterally bent for working its rear end in and through a slot 394 provided in the front wall of the adjacent roller-guide member 323. During the operation of the dispensing mechanism H, the dog 393 is successively engaged by the rollers 343 of the vending mechanism H, each engagement of the dog 393 by a roller 343 effecting swinging actuation of the lever 389 for shifting the slide 385 forwardly in the way 382.

In the event the mechanism K is in non-change-making position, with the tube 367 seated on the coin-rest 368, the fingers 384 merely reciprocate in the channels 383 below the plane of the seat 368 and no coin is discharged from the chute 367. However, if the mechanism K is set for the delivery of "five" cents change, the fingers 384 will protrude one coin thickness above the seat 368 for endwise engaging the channel-overhanging portions of the lowermost coin, as 381, residing on the rest 368 below the end of the tube 367, for shifting said coin forwardly therebetween and discharging the same over the front end of the rest 368.

The remaining coins in the tube 367 then are supported on the fingers 384 until, the dog 393 being disengaged by the particular roller 343, the spring 392 swings the lever 389 rearwardly for restoring the fingers 384 to retracted position for dropping the coin-stack in the tube 367 again upon the coin-rest 367, whereupon the mechanism K is in readiness for repetition of its change-making cycle on ensuing dispensing-operation of the mechanism H.

Mounted on the other front corner post 2' oppositely the mechanism K, is a second change-making mechanism K' substantially similar in form and function to the mechanism K, except that the cam-disc 379' of the mechanism K' is provided with a circumferentially spaced series of flattened peripheral seats 380', 380'', 380''', 380'''', respectively, co-operable with the lugs 371' of the frame 370' on manipulation of the disc 379' for spacing the tube 367' at suitably varying distances from the coin-rest 368' for permitting the discharge of one, two, three, or four coins, also respectively, of the particular denomination, contained in the tube 367'.

In the present instance, such coins comprise pennies or one-cent pieces, and, as best seen in Figure 4, the circumferential margin of the disc 379' is marked or indexed with indicia "1", "2", "3", "4", respectively, opposite the seats 380', 380'', 380''', 380'''', for indicating, when the said indicia are respectively opposite the lug 371', that the apparatus is correspondingly set for delivering one, two, three or four pennies change, as the case may be. Also suitably circumferentially disposed on the disc 379' between the seats 380', 380'''', is an additional indicia "0" for indicating, when opposite the lug 371', that the apparatus K' is inoperative for change-making purposes.

As best seen in Figure 4, the coins dispensed as change from the mechanisms K, K', are discharged into respective chutes 395 supported in and through the door 16', the chutes 395 terminating exteriorly the door 16' in respective bowls or trays 396. A suitable legend plate 397 is provided on the door 16' for directing the customer to the respective trays 396, as best seen in Figure 27.

Mounted on the front corner post 2' below the mechanism K, is an electrical so-called "empty" switch L comprising a bracket 398 attached to the post 2' and supporting an insulation plate 399 carrying a pair of spaced contacts 400. Projecting from the plate 399, is a stud 401 for rotarily supporting a bell-crank-hub 402 on which is mounted, in turn, an insulation disc or rotor 403 parallel with and spaced from the plate 399, the rotor 403 carrying a conducting bridge-contact 404 for engaging or bridging the contacts 400 when the rotor is in one rotated position and for disengaging the same when the rotor is shifted a quarter-turn, more or less.

The rotor 403 carries a rimwise projecting arm 405 alternately engageable with spaced upper and lower stop-pins 406 projecting from the plate 399 for limiting the movement of the rotor 403 to its stated positions. From the hub 402, extends a vertical weighted arm 407 swingable with, and for disposition alternately on opposite sides of the axis of, the hub 402. Normally, however, the weight 407 is forwardly disposed so that the arm 405 engages the lower stop-pin 406 for disengaging the bridge-contact 404 from the contacts 400. Extending rearwardly from the hub 402 approximately at right angles to the arm 407, is a dog 408 having its free or swingable end disposed adjacent the path of movement of the series of trays 337, as best seen in Figures 40 and 41.

Detachably mounted on a particular tray side 338, is a spring-clip 409 having a laterally bent head adapted for engaging the dog 408 on movement of the particular tray 337 therepast. Such engagement of the dog 408 by the clip 409 effects oscillation of the rotor 403 for engaging the bridge-contact 404 with the contacts 400, the weight-arm 407 then being rearwardly inclined for biasing the rotor-arm 405 upon the upper stop pin 406.

Mounted on the other post 2' oppositely to the switch L, is a push-button switch 410 normally covered or concealed by the door 16', as will be understood from Figure 4, the switch 410 being connected in the circuit of the clutch mechanism F, as will presently appear.

Disposed above the mechanisms K, K', is an electrical so-called "Starter" switch mechanism M comprising a frame or switch box 411 supported by and between the front corner posts 2'. On the rear wall of the box 411, is insulatably mounted a pair of circularly aligned arcuate contact-segments 412, 413, respectively, one contact, as 412, being longer than the other contact 413.

Extending across the front of the box 411, is a skeleton frame including a hub 414 rotarily supporting a shaft 415, on which is intermediately mounted a lever 416 carrying at one end an insulatably mounted conducting bridge contact 417. A suitably mounted spring 418 is engaged between the other end of the lever 416 and an adjacent wall of the box 411 for normally biasing the bridge-contact 417 in engagement with merely the arcuate contact 412. However, on a quarter revolution of the shaft 415, the contact 417 is adapted to bridge and electrically connect the arcuate contacts 412, 413, as will be understood from Figure 4.

Mounted on the forward end of the shaft 415, is a knob 419 adapted for projecting through a suitably provided aperture of the door 16', the door 16' carrying a suitable escutcheon 420 for surrounding the knob 419 and bearing suitable indicia for indicating the proper direction of manual manipulation of the knob 419, as best seen in Figure 27.

Suitably bracketed from one of the posts 2', above the switch mechanism M, is a lamp 421 disposed for illumination, on closure of the switch L, of a screen 422 mounted in the door 16', the screen 422 bearing suitable indicia comprising the word "empty", as indicated by dotted lines, also in Figure 27.

Supported suitably by and between the brackets 5', is a display-box 423 suitably illuminated by a lamp 424 bracketed from one of the corner-posts 2' beneath the shelf 348, the door or lid 8' being suitably glazed, as at 425, for affording visual inspection of the illuminated object, as 426, displayed in the box 423, as best seen in Figure 3.

Referring now to Figure 46, which represents the wiring diagram of the apparatus, merely the foot-section E' and the next adjacent section E are shown in connection with the control section A, the other sections E, if any, being similar to the one shown and hence omitted from the drawings.

The feed and return mains 427, 428, respectively, are brought into the control-section A through suitable fuses 429, as also seen in Figure 1, the mains 427, 428, being then extended through the several vending sections E and terminating in the foot-section E'.

The selector-circuit P comprises a branch feeder 430 leading upwardly from the feed-main 427 for terminating at the accumulator magnet 214. From the magnet 214, a lead 431 is run to one pole of the accumulator cam-switch 170, the other pole thereof being connected by a lead 432 to the pole 164 of the selector-switch B'. From the intermediate pole 166 of the switch B', a lead 433 is run to one pole of the selector-feed cam-switch 169. The other pole of the switch 169 is connected to the upper leg of an intercircuit bus 434 intermediately connected to one pole of the selector-ground cam-switch 168, whose other pole is connected to a branch-return wire 435 leading to the return main 428.

From the branch feeder 430, a lead 436 is run to the reject lamp 253, the latter being connected by a lead 437 to the pole 165 of the selector switch B'.

Another lead 438 is run from the branch feeder 430 to the selector-magnet 155, which, in turn, is connected with the coin-gauging mechanism by a lead 439 leading to the coin-gauging circuit which includes the contacts 97, 96, 89, 90, and lead 114 running to the weighing-switch pole 113, the other pole 116 of the weighing-switch being connected to the bus 434.

The clutch operating circuit Q comprises a branch feeder 440 leading from the feed-main 427 to the clutch-switch blade 196, and from the blade 196, the circuit leads through the brush 204 to the magnet-windings 186 of the clutch C, and from the windings 186 through the brush 203 to the blade 195. The lower leg of the circuit bus 434 is connected to the blade 195, the circuit Q sharing the ground-switch 163 with the circuit P.

The circuit Q also includes the emergency or "starting" push-button switch 255 connected by leads 441, 442, to the bus 434 and feeder return 435, respectively, and also the coin-receptive plungers 37 adapted to be conductively spanned by a deposited coin 443, as shown by dotted lines in Figure 46, the plunger-engaging contacts 41, 42, being likewise connected by leads 444, 445, respectively, with the bus 434 and feeder return 435.

A branch-feeder wire 446 and a branch-return 447 lead from the feed and return mains 427, 428, respectively. The branch-feeder 446 is run to the lamp 236, which, in turn, is connected by a lead 446' with the finger b of the contacts 245, and the branch-return 447 is run directly to the finger a of said contacts.

The subtractor feed circuit R includes a lead 448 running from the branch-feeder 446 to one side of the subtractor-magnet 216, and from the other side of the magnet 216 a subtractor magnet-bus 449 is run through the vending sections E and terminates at the subtractor-magnet finger 301 of the section E', leads 450 running from the bus 449 to the respective subtractor-magnet-fingers 301 in the sections E. Each finger 301 is engaged with the contact-segment 302 of the particular subtractor-switch G, the segment 302 being, in turn, engaged with the poles b', c', d', etc., of the contacts 300 according to the setting of the price indexing lever 305. In turn, the contacts 300 are engageable by the subtractor-contact 292 of the controller-rotor 289.

The subtractor-feed-circuit R also includes the coin-release magnet 159, one side of which is connected by a lead 451 with the branch-feeder 446. The other side of the magnet 159 is connected to a coin-release-bus 452 running through the sections E and terminating at the coin-release finger 299 of the section E', leads 453 running from the bus 452 to the respective fingers 299 in the sections E and each finger 299 being likewise engageable by the contact 292 of the rotor 289.

The ground for the subtractor feed-circuit R is afforded by a so-called "foot section interlocking" ground-circuit S comprising a series of inter-section ground wires 454 each running between a respective pair of adjacent vending-sections, E'—E, E—E, as the case may be, in each of which particular pairs of sections the one nearest the section A may be designated as the "head" section, and the other section as the "foot" section. Each ground wire 454 is run from the finger 296 of the switch G of a particular "foot" section to the finger 298 of the switch G of the next adjacent "head" section, the switches G being thus connected in series throughout the vending sections. A conductor 454' is run from the branch-return 447 in the section A for connection with the pole 296 in the particular section E adjacent the control section A. However, in the foot section E', the contact 298 is "dead", as will be understood from Figure 46.

The ground circuit S is called a foot-section interlocking circuit for the reason that, if any particular section is actuated for rotating the controller-rotor 289, the contact 291 will be disengaged from the finger 298, thus interrupting the "ground" of all the "foot" sections preceding the operated section of the series and rendering such "foot" sections inoperative.

It may here be pointed out that, for the better understanding of the circuit-diagram of Figure 46, two representations of the rotor 289 are shown in each vending section; it will be understood, however, that such representations relate to one and the same rotor 289, as indicated by the line connecting the same.

The vending-section clutches F and likewise the selector-clutch C are included in a "head-section interlocking" circuit T, which also includes the branch feeder 440 and the normally engaged switch-blades 196, 198, of the clutch-mechanism C. Running from the blade 198 in the section A, is a vending-clutch feeder 455, which leads to the blade 196' of the clutch-mechanism F in the extreme "foot" section E'.

From the section E', a series of inter-section feed wires 456 are run, each between a respective pair of sections E', E, or E, E, as the case may be, each feed wire 456 being run from the blade 198' of a particular "foot" section to the blade 196' of the next adjacent "head" section, thus connecting the clutches F in series throughout the vending sections, as will also be understood from Figure 46, the blade 198' in the section E adjacent the control section A being dead.

The circuit T also includes a motor-feed bus 457, which leads from one side of the motor 179 and connects with each switch-blade 197, 197', as the case may be, of the sections A, E, E'. From the other side of the motor 179, a lead 458, protected by a fuse 459, connects with the return-main 428.

As has been described, each blade 196 or 196' is connected by the brush 204 or 204' with the winding 186 or 186' of the clutch C or F, as the case may be. It will be seen that, beginning with the section A, the clutch C is fed directly from the branch-feeder 440; the clutch F in the terminal section E' is fed through the contacts 196, 198, and feeder-line 455; and from thence each successive "head" section E is fed through the contacts 196', 198', and inter-section lead 456 of its particular adjacent "foot" section.

The circuit T is, therefore, called a "head-section interlocking" circuit, for, as has been said, when the clutch C is energized, the blade 196 is disengaged from the blade 198, thus interrupting the feed circuit of all the vending clutches F, thereby rendering the same inoperative as a group, and, likewise, when any particular clutch F is energized, the particular blade 196' is disengaged from the blade 198' thereof, thus interrupting the feed circuit of all the remaining "head" sections following the operated clutch of the series and rendering the same, in like manner, inoperative.

Thus, when the coin-selecting section A is in operation, all of the vending-sections E, E', are inoperative, and when any particular vending section, as a section E, for example, is operated all the other "head" sections are rendered inoperative by interruption of the feed circuit T, and all the "foot" sections are rendered inoperative by interruption of the ground-circuit S.

Finally, as will be understood, when any clutch C or F is actuated, the particular switch blade 196 or 196' engages the corresponding blade 197 or 197' for feeding the motor-bus 457 and thus effecting actuation of the motor 179 for operation of the mechanism controlled by the particular clutch C or F, as the case may be.

In each vending section E, E', the particular clutch-operating circuit V includes the brush 204', windings 186', brush 203', and switch-blade 195'. From the blade 195', a lead 460 is run to the finger 297 of the switch G, which finger 297 normally resides in the notch 290 of the controller-rotor 289. However, on initial rotation of the rotor 289, the same will contact the finger 297 for closing the clutch circuit V through the ground circuit S, which is the normal ground for the clutch F during the operation of the vending mechanism H, the ground connection being interrupted on completion of one revolution of the rotor 289 when the finger 297 is again disposed in the notch 290.

However, as the rotor 289 may not be rotated until a ground connection is established for the clutch-circuit V, two additional normally open paths are provided for energizing the clutch F. One path is through the emergency or "loading" switch 410, the opposite poles of which are connected by a lead 461 with the clutch-lead 460, and by a branch-return 462, with the return-main 428, respectively. The switch 410 is described as a "loading" switch for its principal use is to effect continuous actuation of the series of trays 337 past the shelf 348 for "loading" or stocking the mechanism H with the articles to be vended.

I might here state that, prior to completion of the loading operation of the mechanism H, as will presently more particularly appear, the clip 409 is mounted on a particular tray 337 just below the switch L so that, when the particular tray 337 carrying the clip 409 again appears on the front run of the tray-series, the empty switch L will be actuated for illuminating the lamp 421 at a time when there remains but three or four articles in the mechanism H for vending purposes.

In such respect, a brief digression may here be made to describe the circuit of the switch L, which comprises a lead 463 running from the feed-main 427 to the lamp 421, and from thence to one pole of the switch L, the other pole thereof being connected to the branch-return 462. Conveniently, also, it may be said, the display lamp 424 is connected across the branch-feeder 463 and return 462 for affording permanent illumination of the display box 423.

Reverting again to the clutch-control circuit, the other path provided for energizing the clutch F is through the "starting" switch M, which forms a part of the vending control circuit W, which latter includes a lead 464 running from the clutch-lead 460 to the contact-segment 412 of the switch M. The other contact 413 of the switch M is connected by a lead 465 with the finger 312 of the pricing-switch G', the finger 312 having permanent sliding engagement, as has been said, with the price-indexing contact segment 311, and the latter having pre-selected engagement with a particular one of the poles b", c", d", etc., of the price-indexing contacts 316.

Leading from the series of contacts 316, is a corresponding series of conductors 466, the series of conductors 466 in each vending section E, E', being gathered into a cable 467, which is common to and extends through all the vending-sections and terminates in the section A at the vending control switch D' for connection of the conductors 466 to the contacts 245, the particular poles b, c, d, etc., thereof being respectively connected with the also respective indexing poles of like reference characters, as b", c", d", etc., throughout the vending sections E, E'.

Therefore, the index-poles b" of the contacts 316 of all the switches G' are grounded, as may be said, through the branch-return lead 447, when the rotor 241 is actuated for connecting the ground contact a with the pole b of the contacts 245 of the switch D'. Similarly, all the poles b" and c" are grounded when the rotor 241 is advanced another step to pole-position for engaging the poles b and c, and so on, all the fingers b" to k", inclusive, being grounded when the rotor 241 is fully advanced for engaging the contacts b to k, also inclusive, as shown by dot-dash-lines in Figure 46.

In describing the use and operation of my invention, reference will first be made to Figures 9 to 13, inclusive, for illustrating the several steps of the operation of the coin-selecting mechanism B. Normally, that is, when the machine is at rest in coin-depositing position, the co-operant parts and their several particular electrical circuits are disposed as best seen in Figures 1, 2, 5, 6, 7, 16, and 26, and diagrammatically in Figure 13.

Referring now to Figure 13, deposit of a coin or unit value 443 on the plungers 37 will in most instances establish metallic connection therebetween for grounding the circuit Q therethrough, although, in emergency, the customer may actuate the push-button switch 255 for grounding the circuit Q. In either case, grounding of the circuit Q energizes the clutch C, which clutches itself to the shaft 176 for effecting mechanical connection between the mechanism B and the motor 179, and meanwhile actuates the switch-blade 196 for engaging the same with the blade 197, thus closing the circuit to the motor 179 for setting the mechanism B in motion, and also disconnecting the vending-clutch circuit T from its source of current supply.

On initial movement of the shaft 63, the cam 171 closes the ground switch 168, grounding the intercircuit bus 434 and sustaining the energization of the clutch C after the contacts 41, 42, have become disconnected from the plungers 37 on rearward coin feeding actuation of the slide-block 33 responsive to engagement of the wrist-pins 56 with the cam-rings 55 of the vibrating levers 52.

As the slide-block 33 reaches the end of its rearward stroke, the coin 443 is engaged between the opposing walls of the notches 35, 89, and is disposed between the thickness gauging shoes 87, 94, and, if the coin 443 is of proper or predetermined thickness, the contacts 89, 90, and at least one pair of the contacts 96, 97, will then be closed. The slide-body 33 is then returned forwardly for disengaging the balance-frame 70 until the fulcrum-edges 72 bear on their seats 73 for coin-weighing oscillation of the balance-frame 70.

Next the cam 121 actuates the weighing contact arm 113 for engaging the ground contact 116 if the coin is of proper or predetermined weight, as indicated in Figures 8 and 9. The selector-magnet circuit being thus completed, the selector magnet 155 is energized for shifting the follower 143 onto the accept-cam 148 and at the same time actuating the selector-switch B' for engaging the switch arm 166 with the accumulator circuit switch pole 164 and concurrently cutting out the circuit of the lamp 253, the cam 172 meanwhile closing the selector-feed cam-switch 169, all as best seen in Figure 9.

The switch 169 remains in closed position during the ensuing operations of the mechanism B, wherein the slide-block 33 and plungers 37 are returned to initial position, the positioning plate 79 then being engaged by the slide-stop 48 and thereby forwardly shifted for discharging the coin from the frame 70 into the chute 123 and thence with the hopper 126. Meanwhile the cam 148 actuates the valve 127 for, in turn, discharging the so-accepted coin 443 from the hopper 126 into the storage hopper 132. At the completion of this operation, the cam 173 actuates the counter-switch 170, thus closing the accumulator circuit and effecting actuation of the magnet 214 for, in turn, actuating the rotor 241 one step of its rotatory movement, as best seen in Figure 11, with consequences later appearing.

Meanwhile, the cam 121 functions to open the contacts 113, 116, and the coin 443 being removed from the balance-frame 70, the contacts 89, 90 resume their normal disconnected position. Next the cams 172, 173, function to open the respective switches 169, 170, and, finally, the cam 171 opens the switch 168, thus rendering the electrical circuit P of the mechanism B inoperative.

At the same time, the opening of the switch 168 also disconnects the clutch circuit Q from its ground connection, thus de-energizing the clutch C, whereupon the clutch C shifts for mechanically disengaging the mechanism B from the motor 179, the mechanism B then coming to rest with its several co-operant elements restored to initial position.

Likewise, the switch-blade 196 is disengaged from the contact 197, thus interrupting the motor-circuit and stopping the motor 179, the blade 196 again engaging the blade 198 for restoring the vending-clutch interlock circuit T to operative condition, as seen in Figure 13.

Figures 10 and 12 illustrate the conditions obtaining when a coin, as 443', is of improper thickness and/or weight. In the former case, either or both of the pairs of contacts 96, 97, will be separated, or, as in the present instance, the contacts 89, 90, will remain apart, either condition being effective for interrupting the selector-magnet circuit. In the latter case, the weighing contact-arm 113 will be swung to one side or the other of the path of movement of the actuator-pin 119, the cam 121, therefore, becomes ineffective for circuit-closing purposes, as shown in Figure 7 and diagrammatically illustrated in Figure 10.

The selector-magnet 155 hence remains non-energized, and the follower 143 is engaged by the reject-shifter cam 154 for throwing the follower 143 onto the reject-cam 147, which, at the proper time acts on the follower 143 for tilting the valve 127 for discharging the coin 443' from the hopper 126 into the tray 131 for return of the so-rejected coin to the customer, the accounting mechanism D being inactive in such event.

Meanwhile, the selector-switch B' remaining in normal position for closing the circuit through the lamp 253, the cam 172 acts for closing the switch 169 for completing the lamp-circuit, thus illuminating the screen 254 and exhibiting the word "rejected" for visually acquainting the customer that the deposited coin has not been found acceptable, as will be understood from Figure 12.

Referring now to Figure 46, it will be understood that for every accepted coin or unit value deposited in the holding-hopper 132, the tally-rotor 241 is actuated one-step in additive direction. The first step-actuation of the rotor 241, bridges the fingers $a$ and $b$ of the contacts 245, thereby closing the circuit of the lamp 236 during this and succeeding step actuations of the rotor 241 for illuminating the stencils 234 which now successively are brought in registration with the lamp 236, the particular stencil image being cast on the screen 237 for visually recording the customer's "credit" accumulated in and by the machine as represented by the indicated number of coins of the particular denomination the machine is adapted to receive, which, in the present instance, comprises a dime or ten-cent piece.

Assume, for purposes of illustration, that an article to be vented for four-cents is dispensed by the section E. The attendant, therefore, sets the handle 305 of the switch G' opposite the "10" mark on the index bar 308, as shown in Figure 28, thus engaging the contact lug 315 of the index segment 311 with the finger $b''$ of the index-contacts 316, as shown in Figure 29, the finger $b''$ being connected through the cable 467 with the finger $b$ of the accounting mechanism D.

The setting of the handle 305 opposite the index "10" means that, as presently more particularly appearing, each vending operation of the mechanism H will remove "ten-cents" in value from the customer's "credit" in the machine, and since the particular article to be vended sells for merely four cents, six cents in change must be delivered to the customer for balancing his account with the machine.

The attendant, therefore, sets the change-making mechanism K for delivering "5" cents, and, likewise, sets the mechanism K' for delivering "1" cent, by suitably manipulating the cam-discs 379, 379', respectively, as best seen in Figure 4, whereby a total amount of six cents in change will be delivered to the customer on each vending operation of the mechanism H.

Assume, again that the customer has one dime to his credit in the machine, the vending control switch-rotor 241 having been actuated one step for grounding the pole $b$ to the ground-pole $a$, as best seen in Figure 23. The customer, now desiring to purchase an article from the particular section E having the four-cent article manipulates the knob 419 for closing the switch M of that section, thus completing the ground for the clutch-circuit V for energizing the clutch-windings 186' of the clutch F.

The clutch-windings 186' initially attract the armature 278 for releasing the shoe 283 and allowing the clutch F to shift axially for disengaging the lugs 272, 273, from the stop-pins 271, thus also releasing the clutch F for rotatory actuation by and with the shaft 264. The clutch F thereupon clutches itself to the shaft 264 for effecting mechanical connection between the mechanism H and the motor 179, shifting movement of the clutch F meanwhile actuating the switch-blade 196' for initially disengaging the same from the particular contact 198' and thus interrupting the "head-section" interlock circuit T, thereby rendering inoperative all the vending-sections on the "head" side of the particular section E. After disengagement from the contact 198', the blade 196' engages the contact blade 197', thus closing the motor circuit through lead 457 and energizing the motor 179 for setting the mechanism H in motion, all as best seen in Figure 28.

On initial clutch-actuated rotation of the rotor 289 of the switch G, the rotor-lug 291 disengages the finger 298, thus interrupting the "foot-section" interlock circuit S and thereby rendering inoperative all the vending-sections on the "foot" side of the particular section E. The rotor 289 meanwhile engages the ground-contact 297 for sustaining the energization of the clutch F after the customer releases the knob 419 and also during the remainder of the vending operation of the mechanism H.

At the same time, the rotor-lug 292 engages the coin-release contact 299 for closing the circuit of the coin-release magnet 159, which, in turn, attracts the armature 158 for tilting the valve 133 rearwardly, the coin in the storage hopper 132 being discharged or collected, as may be said, into the drawer 135.

The lug 292 next engages the pole $b'$ of the subtractor contacts 300, the pole $b''$, by reason of the particular setting of the handle 305, being also engaged by the contact-segment 302. The circuit of the subtractor-magnet 216 being thus closed the magnet 216 actuates the ratchet-wheel 211 one step in reverse direction for, in the case at hand, restoring the dial 233 to initial or "zero" position, thus eliminating the customer's "credit" in the machine.

The vending control switch rotor 241 meanwhile disengages the pole $b$ of the contacts 245, interrupts the circuit of the accept-lamp 236 for extinguishing the same, and also breaks the ground to the finger $b''$ of the switch G', thus rendering the vending-control circuit W inoperative for initiating subsequent actuation of the vending mechanism H until further "credit" is accumulated in the accounting mechanism D.

The motor 179 being energized and the clutch F engaged with the shaft 264, the mechanism H is actuated for removing the empty tray 337 from opposite the shelf 348 and bringing the next succeeding loaded tray 337 into registration with the shelf 348, the pusher 352 meanwhile being actuated, as hereinbefore set forth, for depositing the article from the last-mentioned tray onto the shelf 348 for delivery thereof to the customer, as seen in Figure 3.

Meanwhile the mechanisms K and K' are actuated for depositing in the trays 396 one nickel from the mechanism K and one penny from the mechanism K', making up the six cents in change required to balance the machine's account with the customer for this particular transaction.

At this time, the revolution of the rotor 289 brings the notch 290 into registration with the contact 297 and thus interrupts the ground connection for the clutch-circuit V and de-energizes the clutch-windings 186', thus releasing the armature 278, whereupon the cam 284 is impinged by the clutch-shoe 283 for shifting the clutch F from engagement with the clutch-disc 269, and the clutch lugs 272, 273, then again are disposed in registration with the stop-pins 271 for locking the clutch F against rotation for thus effectively preventing fraudulent manual manipulation of the mechanism H.

The releasing movement of the clutch F disengages the blade 196' from the contact 197' and thus interrupts the motor circuit for de-energizing the motor 179, the blade 196' then re-engaging the contact 198' for restoring the continuity of the "head" sections interlocking circuit T. At the same time, the lug 291 of the rotor 289 reengages the contact 298 for restoring the continuity of the "foot" sections interlocking circuit S. The vending operation is thus completed with all the parts restored to their respective initial positions.

Assume, again, that the price of the article to be vended from another section, as E', for example, is to be forty cents. The indexing handle 305 is set opposite the "40" mark on the index bar 308, as will be understood, thus engaging the contact-lug 315 of the index segment 311 with the pole e" of the index contacts 316 of the switch G', which is, in turn, connected through the cable 467 with the pole e of the control switch D'.

While the setting of the handle 305 opposite the index "40" signifies a subtraction of "forty cents" in value from the customer's account with the machine, the price of the article is also forty cents; hence the attendant sets the mechanisms K and K' both to "0" cents, since no change is due the customer from his purchase.

Assume, still again, that the customer has, as before, a credit of merely one dime in the machine. Desiring to purchase the article dispensed by the section E', the customer turns the knob 419 in the usual manner, but without result, for the reason that the accounting mechanism D has not accumulated sufficient credit for engaging the contact 241 with the pole e for completing the circuit through the corresponding pole e" engaged by the lug 315 of the switch G'.

On the other hand, assume that the customer, by successively depositing acceptable coins in the control-section A, has accumulated a value of ten dimes to his credit in the machine, the rotor 241 having been successively actuated a series of ten steps for grounding all the poles b to k, inclusive, to the ground-pole a, as indicated by dot-dash lines in Figure 46, the member "10" then being exhibited, as will be understood, on the screen 237.

Obviously, in such case, manipulation of the switch M in the section E' will be effective for setting the mechanism in motion as hereinbefore described. The "foot" sections interlocking circuit S is not affected in this case, but the "head" sections interlocking circuit T is interrupted for cutting out all the "head" sections E, as will be understood.

When the switch G' was set for engaging the lug 315 with the pole e", the contact segment 302 was correspondingly rotated for engaging all the poles b' to e', inclusive of the switch G. Hence the rotor-lug 292, after touching the contact 299 for actuating the magnet 159 for "collecting" the ten coins the customer has deposited in the machine, moves on and at successive intervals engages the subtractor poles b', c', d', e', thereby also successively energizing the subtractor magnet 216 for subtractive rotation of the ratchet 211 and thus, in turn, actuating the rotor 241 a series of four reverse steps, representing a value of forty cents deducted from the customer's account.

The rotor 241 is therefore retracted for engaging merely the poles a to g, inclusive, representing the sixty cents remaining to the customer's credit, the numeral "6" being now exhibited on the screen 237. The operation is then completed substantially as described for the ten-cent purchase from the section E.

In a similar manner, the customer may make another purchase of the forty-cent article from the section E', and two purchases of the four-cent articles from the section E, no change being received from the section E', and two returns of six cents each in change being made from the section E. Thus, for his one-dollar deposit in the machine, the customer, in such case, receives goods to the value of eighty-eight cents and money to the value of twelve cents.

Assume, however, that the customer desires to make three purchases from the section E'. Since the capacity of the machine does not, in the present instance, exceed one-dollar, the customer may make a one-dollar deposit, make two forty-cent purchases, which will reduce his credit to twenty cents then deposit two dimes more in the machine and close the account with another forty-cent purchase.

However, again, assume the customer has made a deposit in the machine and desires to withdraw such deposit without making a purchase. In such event, it will be recalled that the accepted coins are deposited in the storage hopper 132, and the customer may recover such coins by pressing on the plunger-knob 162 for actuating the plunger 161, thus tilting the valve 133 forwardly for discharging the coins in the hopper 132 into the tray 131. Such manipulation of the plunger 161, as has been described, actuates the accounting mechanism D for setting the same to normal or "zero" position, thereby cancelling the customer's credit and closing his account with the machine.

It would be futile, however, for the customer, by such means, to attempt to recover an unused balance after making a purchase from the machine, since one of the first operations performed on initiating the vending operation is to discharge the coins from the storage hopper 132 into the coin-box 135. In such event, it is necessary to call the attendant, who will refund to the customer the credit shown by the screen 237, the attendant then manipulating the plunger-knob 162 for restoring the machine to normal condition in readiness for the next customer.

As has been said, the "empty" screen 422 is illuminated while there remain some three or four articles in a particular vending section, in order that the attendant may receive warning to refill the section prior to complete exhaustion of the supply of articles therein.

For such purpose, the attendant opens the door 16', thus exposing the front run of the trays 337 and also the push-button switch 410. The attendant first momentarily closes the switch 410 for disengaging the dog 360 from its engaged roller 343 for releasing the lever 353 for rearward movement thereof to position "I" in Figure 3, in which position of the lever 353 the operator may introduce his hand through the box 349 for swinging the pusher 356 to position "II" as also seen in Figure 3. In such position "II" of the pusher 356, it will be seen that the lever 353 may oscillate responsive to engagement of the dog 360 with successive rollers 343 during the loading operation, without penetration of the pusher 356 into the series of trays 337.

The attendant then, preferably, removes the clip 409 and again closes the switch 410, which sets the mechanism H in motion, the attendant depositing an article in each successive empty tray 337 as the same pass downwardly in front of the machine. At the proper time, the attendant attaches the clip 409 to a tray side 338, completes the tray-loading operation, releases the switch 410 for bringing the mechanism H to rest as heretofore described, and restores the pusher 356 to its former operative position.

Thus the machine is capable of meeting mechanically and automatically practically every sales-condition incident to the vending of merchandise, and it is to be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is,—

1. In apparatus of the class described, in combination, a series of electro-responsive dispensing mechanisms, coin-accepting mechanism common to the dispensing mechanisms for electrically controlling actuation thereof, electro-responsive means for accumulating a plurality of accepted unit values, and means for adjustably setting the respective dispensing mechanisms for respective actuations each consuming a definite portion of the accumulated values.

2. In apparatus of the class described, in combination, a series of dispensing mechanisms each including an endless conveyer, electrically operable means for actuating the several conveyers including a common drive shaft, coin-accepting mechanism, electrically operable mechanism for accumulating the value of coins accepted by the accepting mechanism, said accumulative mechanism being common to the several dispensing mechanisms for electrically controlling actuation of said shaft, and means for setting the respective dispensing mechanisms for separate actuation at the same accumulated coin-values accepted by the coin-accepting mechanism.

3. In apparatus of the class described, in combination, a series of dispensing mechanisms each including an endless conveyer, electrically operable means for actuating the several conveyers including a common drive shaft, coin-accepting mechanism, electrically operable mechanism for accumulating the value of coins accepted by the accepting mechanism, said accumulative mechanism being common to the several dispensing mechanisms for electrically controlling actuation of said shaft, and means for setting the respective dispensing mechanisms for separate actuation at respective different accumulated coin-values accepted by the coin-accepting mechanism.

4. In apparatus of the class described, electrically operable coin-accepting mechanism, accounting mechanism electrically responsive to the accepting mechanism for accumulating multiples of a unit value, a plurality of electro-responsive dispensing mechanisms, and means for setting the several dispensing mechanisms for respective operation at selected different multiples of the unit value in the accounting mechanism.

5. In apparatus of the class described, coin-accepting mechanism, an electro-responsive article-dispensing mechanism, an accounting mechanism including a rotatory ratchet-wheel, means for effecting step-by-step rotation of the ratchet-wheel for accumulating unit values following respective actuations of the accepting mechanism, means for setting the dispensing mechanism for operation responsive to accumulation of unit values in the accounting mechanism, means for normally biasing the ratchet-wheel in subtractive direction, and an escapement electro-magnetically actuable on operation of the dispensing mechanism for permitting step-by-step rotation of the ratchet-wheel in subtractive direction.

6. In apparatus of the class described, in combination, coin-responsive mechanism, a plurality of article dispensing mechanisms, and an electrical circuit for effecting actuation of the dispensing mechanisms, said circuit including a normally open control-section comprising a first multi-pole switch and series of second multi-pole switches each for a respective dispensing mechanism, said first and second switches having corresponding poles electrically connected, means for individually adjusting the respective second switches to selected pole-position, and means for actuating the first switch to corresponding pole-position on acceptance of successive coins by the responsive mechanism for effecting closure of the control-section of the circuit.

7. In apparatus of the class described, in combination, coin-responsive mechanism, a plurality of article dispensing mechanisms, an operating circuit for each of the dispensing mechanisms, and a control section for said circuits including a first multi-pole switch and second multi-pole switches each disposed in a respective operating circuit, the first multi-pole switch being movable to successive pole-positions on acceptance of coins by the responsive mechanism, and the second multi-pole switches being individually adjustable to selected pole-position for predetermining the minimum number of poles the first switch must move for effecting closure of the control-section of a particular operating circuit.

8. In apparatus of the class described, in combination, coin-responsive mechanism, article dispensing mechanism, an operating circuit for the dispensing mechanism, a control section for said circuit including first and second multi-pole switches, the first multi-pole switch being movable to successive pole-positions on acceptance of coins by the responsive mechanism and the second multi-pole switch being adjustable to selected pole-position for predetermining the minimum number of poles the first switch must move for effecting closure of the control-section of the operating circuit, and means including a circuit containing a third multi-pole switch adjustable to selected pole position for effecting subtractive actuation of the first switch said predetermined number of poles responsively to operation of the dispensing mechanism.

9. In apparatus of the class described, in combination, electrically operable mechanism for accumulating a plurality of unit values, an electro-responsive article dispensing mechanism operable for consuming a number of the values set-up in the accumulating mechanism, and electrically operable means including an electric circuit and a switch in the circuit for sending impulses through the circuit responsive to operation of the dispensing mechanism for subtracting one at a time the consumed number of unit values from the accumulating mechanism.

10. In apparatus of the class described, in combination, electrically operable mechanism for accumulating a plurality of unit values, an electro-responsive article dispensing mechanism, means for setting the dispensing mechanism for permissive operation thereof responsive to accumulation of a selected number of unit values in the accumulating mechanism, and means responsive to operation of the dispensing mechanism for subtracting one at a time the consumed number of unit values from the accumulating mechanism.

11. In apparatus of the class described, in combination, value-accumulating mechanism, article dispensing mechanism operable for consuming values set-up in the accumulating mechanism, means for setting the dispensing mechanism for permissive operation thereof responsive to accumulation of values in the accumulating mechanism, an electrical circuit having a first multipole rotor switch actuable responsively to said setting means for advancing to a particular pole position, a second multi-pole rotor switch having its poles connected with corresponding poles of the first switch, means for actuating the rotor of the second switch responsively to operation of the dispensing mechanism for successively engaging the second rotor with its poles for closing said circuit through said switches, and means responsive to closure of said circuit for subtracting the consumed values from the accumulating mechanism.

12. In apparatus of the class described, in combination, value-accumulating mechanism, article dispensing mechanism operable for consuming values set-up in the accumulating mechanism, means including a control circuit having a first multi-pole rotor switch actuable for advancing to a particular pole position for setting the dispensing mechanism for permissive operation responsive to accumulation of values in the accounting mechanism, a second circuit including a second multi-pole rotor switch actuable by and with the first switch, a third multi-pole rotor switch having its poles connected with corresponding poles of the second switch, means for actuating the rotor of the third switch responsively to operation of the dispensing mechanism for engaging the third rotor with its poles for effecting closure of the second circuit through the second and third switches, and means responsive to closure of the second circuit for subtracting the consumed values from the accumulating mechanism.

13. In apparatus of the class described, in combination, electrically operable coin-accepting mechanism, means electrically responsive to the accepting mechanism for accumulating a plurality of accepted unit coins, an article-dispensing mechanism including an endless conveyer, and electrically operable means responsive to accumulation of unit values for effecting actuation of the conveyer.

14. In apparatus of the class described, in combination, a plurality of electro-responsive dispensing mechanisms each including an endless conveyer, a driving-shaft common to the conveyers, means including a normally closed circuit for electrically interlocking said mechanisms one with the other, and means operable on actuation of any one particular conveyer for opening the circuit for preventing actuation of any of the remaining conveyers during actuation of said one particular mechanism.

15. In apparatus of the class described, in combination, a plurality of electro-responsive dispensing mechanisms each including an endless conveyer, a driving-shaft common to the conveyers, means including a normally closed circuit for electrically interlocking said mechanisms one with the other, and means including a switch actuable responsively only to operation of any one mechanism for opening said circuit for preventing actuation of the remaining mechanisms during actuation of the particular mechanism.

16. In apparatus of the class described, in combination, a plurality of dispensing mechanisms, operating means including an operating circuit for each mechanism, normally closed interlocking circuits for connecting the several operating circuits, and switches included in said interlocking circuits actuable responsively to dispensing operation of any one particular mechanism for opening the interlocking circuits for preventing operation of any of the remaining dispensing mechanisms during actuation of the particular mechanism.

17. In apparatus of the class described, in combination, a plurality of dispensing mechanisms, operating means including an operating circuit for each mechanism, an interlocking circuit for connecting the several operating circuits, and switches included in the interlocking circuit respectively actuable responsively to dispensing operation of any one particular mechanism for interrupting the interlocking circuit for preventing actuation of the remaining dispensing mechanisms during actuation of the particular mechanism.

18. In apparatus of the class described, in combination, a plurality of dispensing mechanisms, operating means including an operating circuit for each mechanism, an interlocking circuit leading to and between the successive operating circuits, and series of switches included in said interlocking circuit for respective connection with an operating circuit and actuable responsively to dispensing operation of any one particular dispensing mechanism for interrupting the interlocking circuit between the operated switch and the succeeding switches in the series for preventing actuation of their companion dispensing mechanisms during actuation of the particular dispensing mechanism.

19. In apparatus of the class described, in combination, a plurality of dispensing mechanisms, operating means including a series of operating circuits for said mechanisms, interlocking ground and feed circuits for respectively connecting said operating circuits, and switching means in the interlocking circuits actuable responsively to dispersing operation of any one particular dispensing mechanism for respectively disconnecting the ground circuit of the preceding mechanisms and for disconnecting the feed-circuit of the succeeding mechanisms for preventing operation of any of the remaining dispensing mechanisms during actuation of the particular mechanism.

20. In apparatus of the class described, in combination, a plurality of dispensing mechanisms, a normally open electrical circuit including power means, and a feeder-line comprising a plurality of switches normally connected in series, said switches being respectively actuable responsively to dispensing operation of any one particular mechanism for closing the circuit for effecting power actuated operation of said particular mechanism and concurrently interrupting the feeder line leading to the following switches of the series for preventing actuation of any of the remaining mechanisms during operation of said particular mechanism.

21. In apparatus of the class described, in combination, value-responsive mechanism for accumulating a plurality of unit values, dispensing mechanism operable for consuming a fractional portion of the accumulated unit values, change-making mechanism actuable for delivering to a customer money representing the remaining fractional portion of the accumulated unit values, and means for actuating the change-making means responsive only to operation to the dispensing mechanism, said change-making mechanism including a coin-rest, a coin-tube longitudinally movable relatively to and over the coin-rest, and a reciprocable member for pushing engagement with a coin deposited on the coin-rest.

22. In apparatus of the class described, in combination, value-responsive mechanism for accumulating a plurality of unit values, dispensing mechanism operable for consuming a selected number of unit values plus a fractional-portion of an additional unit value, change-making mechanism actuable for delivering to a customer money representing the remaining fractional-portion of said additional unit value, and means for actuating the change-making mechanism responsively only to operation of the dispensing mechanism.

23. In apparatus of the class described, in combination, value-responsive mechanism for accumulating a plurality of unit values, dispensing mechanism operable for consuming a selected number of whole unit values plus a fractional-portion of an additional whole unit value, means for setting the dispensing mechanism for permissive operation thereof only on accumulation of a predetermined number of whole unit values in the responsive mechanism greater by one than the number of whole unit values for which the dispensing mechanism is operable, and change-making mechanism actuable only on operation of the dispensing mechanism for delivering to a customer money representing the remaining fractional-portion of said additional whole unit value.

24. In apparatus of the class described, in combination, value-responsive mechanism for accumulating a plurality of whole unit values, dispensing mechanism operable for consuming a selected number of whole unit values plus a fractional-portion of an additional unit value, means for setting the dispensing mechanism for permissive operation thereof only on accumulation of a predetermined number of whole unit values in the responsive mechanism greater by one than the number of whole unit values for which the dispensing mechanism is operable, change-making mechanism actuable only on operation of the dispensing mechanism for delivering to a customer money representing the remaining fractional-portion of said additional unit value, and means for adjusting the change-making mechanism for delivery of different fractional-portions of a unit value.

25. In an apparatus of the class described, in combination, electrically operable coin-accepting mechanism, means electrically responsive to the accepting-mechanism for accumulating multiples of a unit value, mechanism electrically operable for dispensing articles having a value fractionally less than a unit value or a value fractionally less than the aggregate value of a number of unit values, and means operable on actuation of the dispensing mechanism for releasing the difference between a whole unit value and such fractional part thereof.

26. In an apparatus of the class described, in combination, electrically operable coin-accepting mechanism, means electrically responsive to the accepting-mechanism for accumulating multiples of a unit value, mechanism electrically operable for dispensing articles having a value fractionally less than a unit value or a value fractionally less than the aggregate value of a number of unit values and means operable on actuation of the dispensing mechanism for releasing the difference between a whole unit value and such fractional part thereof, said means including a coin-rest, and a plunger shiftable past the coin-rest for dislodging a coin therefrom.

27. In an apparatus of the class described, in combination, electrically operable coin-accepting mechanism, means electrically responsive to the accepting-mechanism for accumulating multiples of a unit value, mechanism electrically operable for dispensing articles having a value fractionally less than a unit value or a value fractionally less than the aggregate value of a number of unit values, and means operable on actuation of the dispensing mechanism for releasing the difference between a whole unit value and such fractional part thereof, said means including a coin-rest, a plunger shiftable past the coin-rest for dislodging a coin therefrom, a shiftable frame for supporting the plunger, a coin-tube carried by the frame for feeding coins to the coin-rest, and a cam for shifting the frame for regulating the heighth of the plunger above the coin-rest.

28. In an apparatus of the class described, in combination, electrically operable coin-accepting mechanism, means electrically responsive to the accepting mechanism for accumulating multiples of a unit value, mechanism electrically operable for dispensing articles having a value fractionally less than a unit value or a value fractionally less than the aggregate value of a number of unit values, and means operable on actuation of the dispensing mechanism for releasing the difference between a whole unit value and such fractional part thereof, said means including a support, a coin-rest on the support having a width less than the diameter of the coin, a coin-tube carried by the support, and fingers shiftable past the rest for engaging the opposite overhanging segments of a coin deposited thereon from the coin-tube.

29. In an apparatus of the class described, in combination, electrically operable coin-accepting mechanism, means electrically responsive to the accepting-mechanism for accumulating multiples of a unit value, mechanism electrically operable for dispensing articles having a value fractionally less than a unit value or a value fractionally less than the aggregate value of a number of unit values, the dispensing mechanism including a conveyer, mechanism for delivering coins to a customer for releasing the difference between a whole unit value and such fractional part thereof, and means on the conveyer for actuating the change-making mechanism.

30. In apparatus of the class described, power-operable coin-accepting mechanism, a normally open electric circuit including a plunger for closing the circuit on deposit of a coin thereon, said plunger being slidably shiftable for feeding the deposited coin to said mechanism, a motor and an electric circuit for controlling the operation of the motor, and means operable on closing of the first circuit for drivingly connecting the motor with said mechanism and closing the second circuit for energizing the motor for driving said mechanism and actuating the plunger.

31. In apparatus of the class described, power-operable coin-accepting mechanism, a normally open electric circuit including a plunger for closing the circuit on deposit of a coin thereon, said plunger being slidably shiftable for feeding the deposited coin to said mechanism, a motor and an electric circuit for controlling the operation of the motor, and means comprising an electromagnetic clutch operable on closing of the first circuit for drivingly connecting the motor with said mechanism and closing the second circuit for energizing the motor for driving said mechanism and actuating the plunger.

32. In apparatus of the class described, power-operable coin-accepting mechanism, a normally open electric circuit including a plunger for closing the circuit on deposit of a coin thereon, said plunger being slidably shiftable for feeding the deposited coin to said mechanism, a motor and an electric circuit for controlling the operation of the motor, and means comprising co-operable clutching members electro-magnetically movable on closing of the first circuit for drivingly connecting the motor with said mechanism and switching elements actuable responsive to movement of said members for closing the second circuit for energizing the motor for driving said mechanism and actuating the plunger.

33. In an apparatus of the class described, in combination, coin-accepting mechanism, a coin hopper for receiving a coin from the accepting mechanism, a valve forming a closure for the hopper and actuable for distributing an accepted coin from the hopper, and means under control of the accepting-mechanism for actuating the valve subsequently to deposit of an accepted coin in the hopper.

34. In an apparatus of the class described, in combination, coin-accepting mechanism, a coin hopper for receiving a coin from the accepting-mechanism, a valve forming a closure for the hopper and actuable for distributing an accepted coin from the hopper, means under control of the accepting-mechanism for actuating the valve subsequently to deposit of an accepted coin in the hopper, a device operable from zero-position for accumulating values of accepted coins, and a switching circuit co-operable with the valve-actuating means for controlling operation of the accumulating device.

35. In apparatus of the class described, in combination, electrically operable coin-accepting mechanism, electrically operable accounting mechanism including a pawl and an accumulator-ratchet operable by the pawl progressively from zero-position responsively to acceptance of coins by the accepting-mechanism, and means for laterally shifting the ratchet relatively to the pawl for mechanically resetting the ratchet to zero-position.

36. In apparatus of the class described, in combination, coin-accepting mechanism, article-dispensing mechanism, a control circuit including a first multi-pole switch actuable responsively to acceptance of coins by the accepting-mechanism for advancing to successive pole-positions, a normally open second circuit containing a second multi-pole switch, the second switch having a first rotor adjustable for engaging a series of selected switch poles and a second rotor actuable responsively to operation of the dispensing-mechanism for successively engaging the series of selected switch-poles for closing said second circuit, and means responsive to closure of said circuit for retractively actuating the first switch from advanced pole-position.

37. In apparatus of the class described, in combination, coin-accepting mechanism, article-dispensing mechanism, a control circuit including a first multi-pole switch actuable responsively to acceptance of coins by the accepting-mechanism for advancing to progressive pole-positions, a normally open second circuit containing a second multi-pole switch comprising a stationary disc, spaced poles carried by said disc, a first rotor adjustable for engaging a selected number of said poles, a second rotor actuable responsively to operation of the dispensing-mechanism for progressively engaging said poles for effecting successive closures of the second circuit, and means responsive to successive circuit closures for retractively actuating said first switch progressively from advanced pole-position.

38. In apparatus of the class described, in combination, coin-accepting mechanism, article-dispensing mechanism, a normally open control circuit including a first multi-pole switch actuable for advancing to a particular pole-position responsively to acceptance of coins by the accepting mechanism, a normally open second circuit including a second multi-pole switch having a first rotor adjustable for engaging a series of selected switch poles and a second rotor actuable for successively engaging the series of selected switch-poles for closing said circuit therethrough, operating means for the dispensing means including co-operable clutching members operable for engagement responsive to closure of the first circuit, means for actuating said second rotor by and with one of said clutching members, and means responsive to closure of said circuit for retractively actuating the first switch from advanced pole-position.

39. In apparatus of the class described, in combination, a coin-accepting mechanism, a plurality of dispensing-mechanisms, power-means and a normally open circuit therefor, an operating circuit under control of the accepting-mechanism and having branches leading to the respective dispensing-mechanisms, electro-magnetic clutching means included in each of said operating branch circuits for mechanically connecting the power-means with the particular dispensing-mechanism, and normally closed interlocking feed circuits connecting said operating circuits in series, said feed circuits including switches operable responsively to actuation of a particular clutching means for interrupting the feed circuit of all the operating-circuits preceding in the feed-circuit-series.

40. In apparatus of the class described, in combination, coin-accepting mechanism, a plurality of dispensing-mechanisms, power-means and a normally open circuit therefor, an operating circuit under control of the accepting-mechanism and having normally open branch-circuits leading to the respective dispensing-mechanisms, an electro-magnetic clutching means included in each of said operating branch-circuits for mechanically connecting the power-means with the particular dispensing-mechanism, normally closed interlocking feed circuits connecting said operating circuits in series, means for selectively closing the branch-circuits for actuating a particular clutching means, said feed circuits including switches operable responsively to actuation of a particular clutching means for interrupting the feed circuit of all the operating-circuits preceding in the feed-circuit-series, and means operable on and with actuation of the clutching means for concurrently closing the power circuit for effecting actuation of the particular dispensing-mechanism.

41. In apparatus of the class described, in combination, coin-accepting mechanism, an accounting mechanism comprising an axially shiftable rotatory shaft, a contact rotor on the shaft, and series of spaced contacts engageable by the rotor, electrically operable means including a ratchet-wheel operable responsively to acceptance of coins by the accepting-mechanism for actuating said shaft for step-by-step rotation of said rotor for progressively engaging the series of contacts, means for latching said ratchet-wheel in rotated position, means for rotarily biasing said shaft against the latching means, and means for mechanically axially shifting the shaft for disengaging the ratchet-wheel from the latching means.

42. In apparatus of the class described, in combination, coin-accepting mechanism, a coin-distributing hopper for receiving a coin from the accepting mechanism, a coin-storage hopper, a chute for receiving rejected coins, a repository for accepted coins, a first valve actuable for discharging a coin from the distributing hopper either into the chute or into the storage hopper, a second valve, means for actuating the second valve for selectively discharging a coin from the storage-hopper into either the chute or the repository, and means under control of the accepting mechanism for actuating the first valve subsequently to deposit of a coin in the storage-hopper.

43. In apparatus of the class described, in combination, coin-accepting mechanism, an electro-responsive value-accumulating device additively operable step-by-step responsive to successive acceptance of coins, mechanism electrically operable following operation of said device for moving an article for dispensing the same, and means including an electric circuit and a switch in the circuit for sending impulses through the circuit responsively to actuation of the dispensing-mechanism for subtractively step-by-step actuating the value-accumulating device.

44. In apparatus of the class described, in combination, coin-accepting mechanism, a hopper for temporary storage of accepted coins, a value-accumulating device electrically additively operable responsive to successive acceptance of coins, mechanism electrically operable following operation of said device for moving an article for dispensing the same, means electrically operable responsively to actuation of the dispensing-mechanism for subtractively step-by-step actuating the value-accumulating device, and means operable prior to operation of the subtractive means for discharging coins from the hopper.

45. In apparatus of the class described, in combination, coin-accepting mechanism, a value-accumulating device electrically operable responsive to successive acceptance of coins by the accepting mechanism, mechanism electrically operable following operation of said device for moving an article for dispensing the same, means effective for collecting coins from the accepting mechanism for temporary storage pending operation of the dispensing mechanism, means for discharging coins from the storage means for return to the customer prior to actuation of the dispensing mechanism and concurrently resetting said device to zero, and means actuably responsive to movement of the dispensing mechanism for discharging coins from the storage means for retention in the machine.

46. In apparatus of the class described, in combination, coin-accepting mechanism, accounting mechanism including an accumulator operable progressively step-by-step from zero-position responsively to successive acceptance of coins by the accepting mechanism, mechanism under control of the accounting mechanism for moving the articles to be dispensed, a hopper for collecting coins from the accepting mechanism for storage pending operation of the dispensing mechanism, and means for permitting removal of coins from the hopper and concurrently resetting the accumulator to zero-position prior to operation of the dispensing mechanism.

47. In apparatus of the class described, in combination, electrically operable coin-accepting mechanism, a hopper for temporary storage of accepted coins, electro-responsive accounting mechanism including a pawl and an accumulator ratchet operable by the pawl progressively step-by-step from zero-position responsively to acceptance of coins by the accepting-mechanism, and means for discharging coins from the hopper and concurrently laterally shifting the ratchet relatively to the pawl for resetting the ratchet to zero-position.

48. In apparatus of the class described, in combination, coin-accepting mechanism, an electrically operable group of mechanisms for respectively dispensing articles differently priced, an electrical circuit including an accounting mechanism common to the several dispensing mechanisms and actuable for accumulating values responsively to successive acceptance of coins by the accepting mechanism, means in said circuit including pricing-members individually shiftable to respective price-positions corresponding to the value of the articles of the respective dispensing mechanisms for selectively controlling the actuation thereof responsive to accumulation of an equal or greater number of unit values in the accounting mechanism, and electrically operable means including a switch shiftable concurrently with the pricing-members for effecting subtraction from the accounting mechanism of the predetermined value of the articles dispensed.

49. In apparatus of the class described, in combination, coin-accepting mechanism, a main electrical circuit including an accounting-mechanism operable for accumulation of unit values on successive acceptance of coins by the accepting-mechanism, a plurality of branch circuits arranged in parallel with respect to the main circuit and each including a movable article-dispensing mechanism, said dispensing mechanisms being operable at the same or different number of accumulated unit values, means for closing the respective branch circuits for controlling the operation of the respective dispensing-mechanisms responsively to and within the total of the unit values accumulated in the accounting mechanism, and electrically operable means including a switch for effecting subtraction from the accounting mechanism of the predetermined value of the respective articles dispensed.

50. In apparatus of the class described, in combination, article-dispensing mechanism comprising a conveyer, coin-accepting mechanism, means for electrically actuating the conveyer, and an electrically operable accounting mechanism including a ratchet-wheel having co-operable escapements respectively additively operable for accumulating the values of coins successively accepted by the accepting-mechanism and subtractively operable step-by-step for deducting particular values on actuation of the dispensing-conveyer.

51. In apparatus of the class described, in combination, a series of electro-responsive article dispensing mechanisms, coin-accepting mechanism, electrically operable mechanism for accumulating the values of coins accepted by the accepting mechanism, said accumulating mechanism being common to the several dispensing mechanisms for electrically controlling actuation thereof, and means including individual pricing-switches for setting the respective mechanisms for successive electrical actuation of one or more thereof following acceptance by the coin-accepting mechanism of an aggregate value of unit coins.

52. In apparatus of the class described, in combination, an electro-responsive article dispensing mechanism, coin-accepting mechanism for electrically controlling actuation of the dispensing mechanism, electrically operable mechanism for accumulating the value of coins accepted by the accepting mechanism, and means including a pricing-switch for setting the dispensing mechanism for repetitive operation for consuming the aggregate value of accepted coins accumulated in the accumulating mechanism.

53. In apparatus of the class described, in combination, coin-accepting mechanism, electrically operable mechanism for accumulating the value of coins accepted by the accepting mechanism, an electro-responsive mechanism operable for dispensing articles for values equal either to an accepted unit value or to a multiple of accepted unit values, means including a pricing-switch for selectively predetermining the particular multiple of unit values required to be accumulated for actuation of the dispensing mechanism, and electrically operable means including a switch shiftable concurrently with the pricing-switch for effecting subtraction from the accumulating mechanism of the predetermined value of the article dispensed.

54. In apparatus of the class described, in combination, coin-accepting mechanism, electrically operable mechanism for accumulating the value of coins accepted by the accepting mechanism, a plurality of electro-responsive mechanisms each operable for dispensing articles for respective values equal either to an accepted unit value or to a multiple of accepted unit values, means including pricing-switches for selectively predetermining the respective multiple of unit values required to be accumulated for actuation of the respective dispensing mechanisms, and electrically operable means including a switch shiftable concurrently with the pricing-switches for effecting subtraction from the accumulating mechanism of the predetermined values of the respective articles dispensed.

55. In apparatus of the class described, in combination, coin-accepting mechanism, means electrically responsive to the accepting mechanism for accumulating multiples of a unit value, a series of electro-responsive article dispensing mechanisms, means for setting the respective dispensing mechanisms for electrical operation selectively either at a single unit value or at different multiples of the unit value, and electrically operable means for effecting operation of the respective dispensing mechanisms at such selected number of the unit values and for also effecting operation of the several dispensing mechanisms successively for consuming in selected proportions the total units of value accumulated in the apparatus.

56. In apparatus of the class described, coin-accepting mechanism, accounting mechanism electrically responsive to the accepting mechanism for accumulating multiples of a unit value, an electro-responsive article dispensing mechanism, means including an electric circuit and a pricing-switch for setting the dispensing mechanism for actuation responsive to accumulation of a selected number of unit values equal to or less than the total values accumulated in the accounting mechanism, and electrically operable means including a switch shiftable with the pricing-switch for effecting subtraction from the accounting mechanism of the predetermined value of the article dispensed.

GEORGE McD. JOHNS.